US011241643B2

(12) United States Patent
Schmoll

(10) Patent No.: US 11,241,643 B2
(45) Date of Patent: Feb. 8, 2022

(54) FILTER CARTRIDGE FOR TRANSLATIONAL INSERTION AND ROTATIONAL ENGAGEMENT OF A MANIFOLD

(71) Applicant: 3M INNOVATIVE PROPERTIES COMPANY, St. Paul, MN (US)

(72) Inventor: Jeremy A. Schmoll, Pine Island, MN (US)

(73) Assignee: 3M INNOVATIVE PROPERTIES COMPANY, St. Paul, MN (US)

(*) Notice: Subject to any disclaimer, the term of this patent is extended or adjusted under 35 U.S.C. 154(b) by 16 days.

(21) Appl. No.: 15/929,416

(22) Filed: Apr. 30, 2020

(65) Prior Publication Data
US 2020/0254369 A1 Aug. 13, 2020

Related U.S. Application Data

(60) Division of application No. 16/059,958, filed on Aug. 9, 2018, now Pat. No. 10,702,813, which is a
(Continued)

(51) Int. Cl.
*B01D 35/153* (2006.01)
*B01D 35/30* (2006.01)
(Continued)

(52) U.S. Cl.
CPC ........... *B01D 35/153* (2013.01); *B01D 29/15* (2013.01); *B01D 35/30* (2013.01); *B01D 35/306* (2013.01);
(Continued)

(58) Field of Classification Search
CPC .... B01D 35/153; B01D 35/30; B01D 35/306; B01D 29/15; B01D 2201/302;
(Continued)

(56) References Cited

U.S. PATENT DOCUMENTS

| 4,806,240 A | 2/1989 | Giordano |
| 4,915,831 A | 4/1990 | Taylor |
(Continued)

FOREIGN PATENT DOCUMENTS

| CN | 103742704 | 4/2014 |
| WO | WO 2006/0050114 | 5/2006 |
(Continued)

OTHER PUBLICATIONS

U.S. Appl. No. 14/186,882 board decision Feb. 28, 2017.
International Search Report for PCT/US2016/049422, (dated Jan. 13, 2017) 3 pages.

*Primary Examiner* — Liam Royce
(74) *Attorney, Agent, or Firm* — 3M Innovative Properties Company

(57) ABSTRACT

Described are filter cartridges comprising: a cartridge body and a filter media; a stem extending from the cartridge body, the stem having an inlet opening, an outlet opening, and a stem face that comprises a first valve driving surface and a second valve driving surface; and at least one lug attached to either the filter body or the stem having a leading engagement edge. The filter cartridges are suitable for translational insertion and rotational engagement of a manifold, wherein upon translation insertion, a valve engagement member of the filter cartridge engages a portion of a valve body of a manifold valve; during a first stage rotation, one or more retaining members of the filter cartridge engage a manifold cam of a manifold; and during a second stage rotation, the valve engagement member imparts rotational movement to the valve body. Systems and methods incorporating the filter cartridges are disclosed.

4 Claims, 19 Drawing Sheets

Related U.S. Application Data continuation of application No. 14/851,356, filed on Sep. 11, 2015, now Pat. No. 10,071,326.

(51) Int. Cl.
  *B01D 29/15*  (2006.01)
  *C02F 1/00*  (2006.01)

(52) U.S. Cl.
  CPC .......... *B01D 2201/302* (2013.01); *B01D 2201/4007* (2013.01); *B01D 2201/4015* (2013.01); *B01D 2201/4053* (2013.01); *B01D 2201/4061* (2013.01); *C02F 1/001* (2013.01); *C02F 1/003* (2013.01); *C02F 2201/004* (2013.01); *C02F 2201/006* (2013.01)

(58) Field of Classification Search
  CPC .... B01D 2201/4007; B01D 2201/4015; B01D 2201/4061; B01D 2201/4053; C02F 2201/004; C02F 2201/006; C02F 1/001; C02F 1/003
  See application file for complete search history.

(56) References Cited

U.S. PATENT DOCUMENTS

| | | | |
|---|---|---|---|
| 5,336,406 A * | 8/1994 | Stanford | B01D 35/153 210/235 |
| D455,814 S | 4/2002 | Magnusson | |
| 6,458,269 B1 | 10/2002 | Bassett | |
| 6,632,355 B2 | 10/2003 | Fritze | |
| 6,949,189 B2 | 9/2005 | Bassett | |
| 7,695,619 B2 | 4/2010 | Kurth | |
| 7,763,170 B2 | 7/2010 | Bassett | |
| 8,097,157 B2 | 1/2012 | Tubby | |
| 8,137,551 B1 | 3/2012 | Huda | |
| 8,356,716 B1 | 1/2013 | Kruckenberg | |
| 8,413,818 B1 | 4/2013 | Kruckenberg | |
| 8,591,736 B2 | 11/2013 | Kruckenberg | |
| 8,845,896 B2 | 9/2014 | Kruckenberg | |
| 9,067,154 B1 | 6/2015 | Branscomb | |
| 2002/0121469 A1 | 9/2002 | Garber | |
| 2002/0166805 A1 | 11/2002 | Minns | |
| 2006/0254971 A1 | 11/2006 | Tubby | |
| 2007/0199876 A1 | 8/2007 | Tubby | |
| 2010/0200490 A1 | 8/2010 | Martin | |
| 2010/0307966 A1 | 12/2010 | Fritze | |
| 2011/0174705 A1 | 7/2011 | Branscomb | |
| 2012/0022290 A1 | 1/2012 | Schaub | |
| 2013/0220910 A1 | 8/2013 | Gu | |
| 2013/0341261 A1 | 12/2013 | Maki | |
| 2014/0353235 A1 | 12/2014 | Sherman | |

FOREIGN PATENT DOCUMENTS

| | | |
|---|---|---|
| WO | WO 2012/0103046 | 8/2012 |
| WO | WO 2014/0210365 | 12/2014 |

* cited by examiner

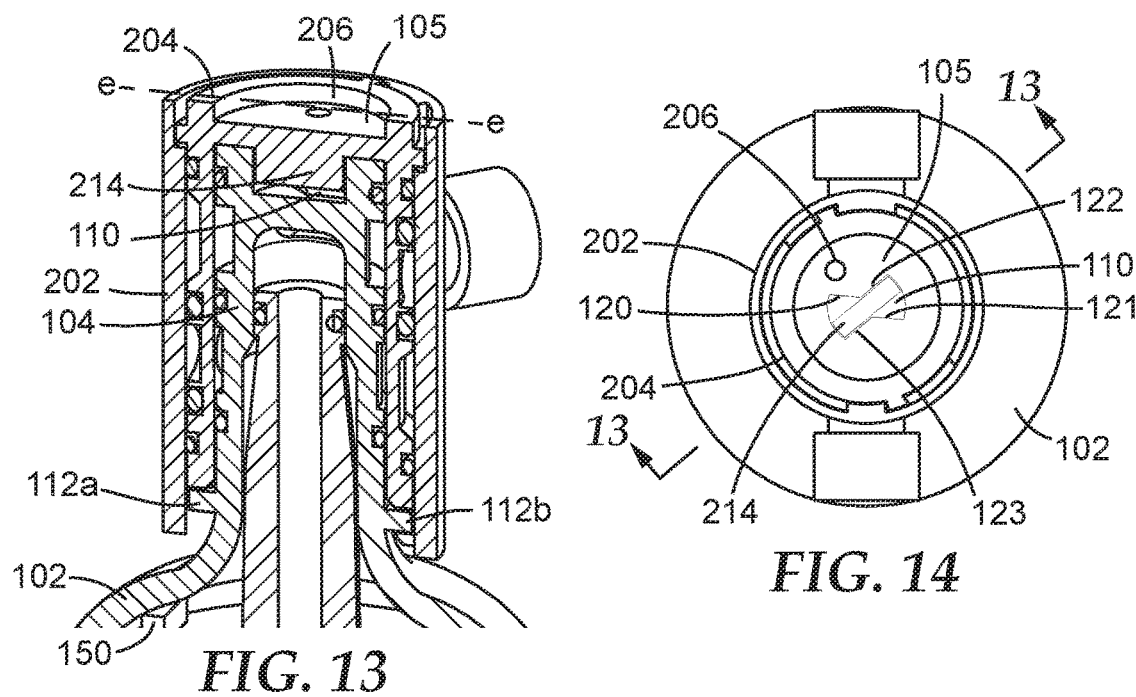
FIG. 13
FIG. 14
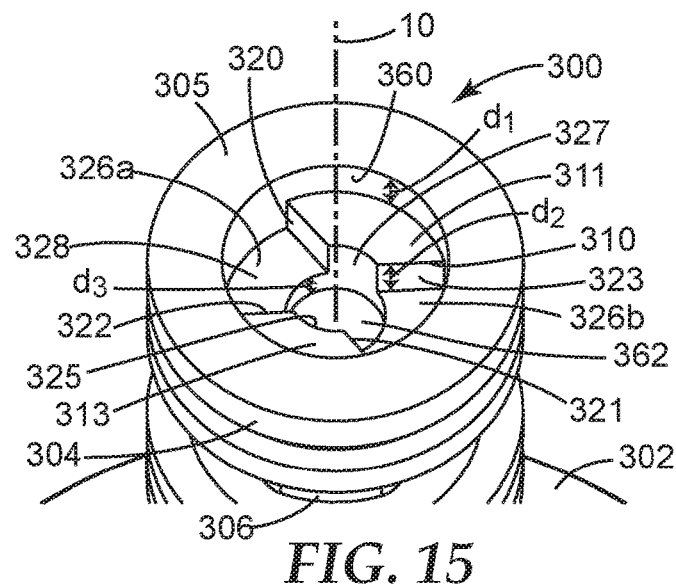
FIG. 15
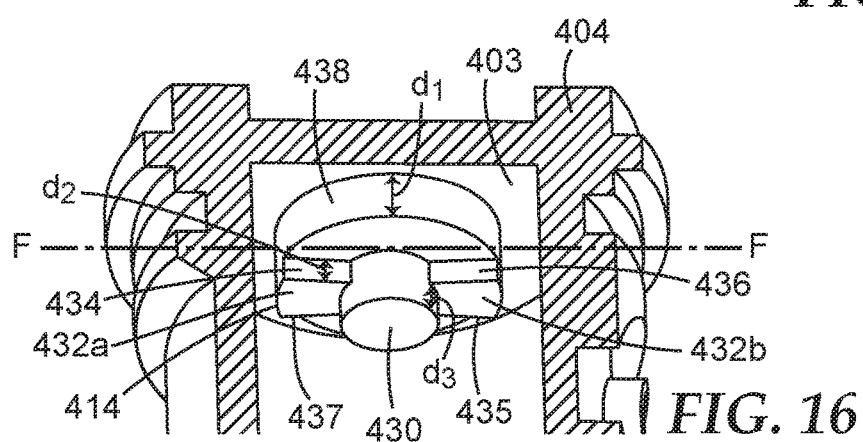
FIG. 16

FILTER CARTRIDGE FOR TRANSLATIONAL INSERTION AND ROTATIONAL ENGAGEMENT OF A MANIFOLD

CROSS REFERENCE TO RELATED APPLICATIONS

This application is a divisional of U.S. application Ser. No. 16/059,958, filed Aug. 9, 2018, now allowed, which is a continuation of U.S. application Ser. No. 14/851,356, filed Sep. 11, 2015, now issued as U.S. Pat. No. 10,071,326, issued Sep. 11, 2018, the disclosures of which are incorporated by reference in their entirety herein.

TECHNICAL FIELD

Embodiments of the present invention relate to the field of fluid treatment, and more particularly to the field of water filter cartridges, and manifolds and filtration systems using such filter cartridges, that are suitable for translational insertion and rotational engagement of a manifold.

BACKGROUND

Many water filtration systems and much of the current technology for interfaces between fluid filters and manifolds are based around a ¼ (quarter) turn devices, which utilize both a translational and rotational motion to install and remove the filter cartridge. Often such fluid filters have an open tip style where water flow is axial into and/or out of the filter, which tend to result in high removal forces due to compression on sealing components (typically o-rings or other rubber-like types of seals) due to the direction of water flow, and compression sets taken by the sealing components.

For quarter (¼) turn filters, most manifolds in the market have three pieces: an inner valve (or valve body) which rotates when a filter is installed, an outer valve (or housing) which has inlet and outlet ports to direct water flow to and from the filter, and a support flange forming a lower part of the housing to contain the inner valve inside the outer valve and hold the filter in place once installed. The manifolds are designed to accommodate stresses that develop during use to ensure the filter is held in place. Often the support flange of the manifold provides this function.

SUMMARY

It is useful to design filter and manifold combinations that minimize removal forces due to compression and/or compression set. Reducing costs of manifolds and filters along with improving manufacturing efficiencies is also an ongoing goal. Furthermore, for safety and compatibility purposes, it is useful to design fluid filters or filtration cartridges that have mechanical keys to corresponding manifolds such that an improper filter is not placed into service in an application for which it is not intended.

The present disclosure provides quarter (¼) turn replaceable filter cartridges suitable for translational insertion and rotational engagement of a manifold. A valve engagement member of the cartridge may be designed as a mechanical key to only correspond to a designated manifold. Such cartridges may be used in various types of manifolds, including those with three main components: a valve body, a housing, and a support flange, and those with only two main components: a valve body and a housing (i.e., no support flange). A mounting bracket is generally provided as needed to secure the manifold in place. A two-component manifold is essentially a water valve that receives the filter cartridge. A support flange is not needed for this type of manifold because the valve body locks into the housing by way of a valve engagement member of the filter, which in turn is held by protrusions or lugs on the filter body that engage with the housing. In many cases, reducing from three to two pieces may reduce cost of the manifold significantly. In some embodiments, the filter is designed to have inlet and outlet water travel radially rather than axially. This removes the stress that was normally applied to the support flange by the filter and inner valve by having only radially acting forces from the water. In other embodiments, the filter is designed to have inlet water flow radially while outlet water flow is axial, in which case there is a balanced flow path to reduces stresses normally associated with inlet/outlet flow that is coaxial.

In a first aspect, a filter cartridge comprises: a cartridge body having a filter media disposed therein; a stem extending from the cartridge body, the stem having an inlet opening, an outlet opening, and a stem face that comprises a first valve driving surface and a second valve driving surface; and at least one lug attached to either the filter body or the stem having a leading engagement edge; wherein the first valve driving surface and the second valve driving surface are separated by a first timing radial arc.

The leading engagement edge may engage with a manifold cam and sweeps a first rotational radial arc of greater than zero and no greater than about 180 degrees between initial engagement and full engagement with the manifold cam. In various embodiments, the first rotational radial arc may be in the range of about 80 degrees to about 170 degrees, or about 90 degrees to about 160 degrees, or about 100 degrees to about 150 degrees, or about 110 degrees to about 140 degrees, or about 120 degrees to about 130 degrees. In a detailed embodiment, the first rotational radial arc is about 125 degrees.

The first valve driving surface and the second valve driving surface may be opposing. When the first and second valve driving surfaces are opposing, the first timing radial arc may be in the range of about 10 to 40 degrees to about 80 to 110 degrees. In various embodiments, the first timing radial arc may be in the range of about 10 degrees to about 80 degrees, or about 40 to about 110 degrees. In an embodiment, the first timing radial arc is about 75 degrees.

The first valve driving surface and the second valve driving surface may be complementary. When the first and second valve driving surfaces are complementary, the first timing radial arc may be in the range of about 70 to 100 degrees to about 140 to 170 degrees. In various embodiments, the first timing radial arc may be in the range of about 70 degrees to about 140 degrees, or about 100 to about 170 degrees. When the first and second valve driving surfaces are complementary, they may be adjacent in that their edges are in contact. In some embodiments, the first valve driving surface and the second valve driving surface are one continuous surface, with a first portion of the continuous surface providing the first valve driving surface and a second portion of the continuous surface providing the second valve driving surface. For example, the first valve driving surface and the second valve driving surface may be part of a continuous U-shaped surface with different portions of the "U" serving as the first and second valve driving surfaces.

The first valve driving surface and the second valve driving surface may be non-parallel to each other.

A second timing radial arc between the leading engagement edge and the first valve driving surface may be in the range of about 0 degrees to about 80 degrees. Alternatively, a second timing radial arc between the leading engagement edge and the first valve driving surface may be in the range of about 100 degrees to about 180 degrees.

The first valve driving surface and the second valve driving surface may sweep a second rotational radial arc of greater than zero and no greater than about 60 degrees between a valve fully open position and an initial valve closing position. In various embodiments, the second rotational radial arc may be in the range of about 10 degrees to about 60 degrees, or about 20 degrees to about 50 degrees, or about 30 degrees to about 40 degrees. In a detailed embodiment, the second rotational radial arc is about 35 degrees.

The filter cartridge may comprise at least two first valve driving surfaces and at least two second valve driving surfaces, wherein there is mirror symmetry between the first valve driving surfaces and the second valve driving surfaces.

The first and the second value driving surfaces may be disposed within an aperture. The aperture may comprise a shape having a central area and two outer portions, the central area having a width that is narrower than widths of the outer portions. The stem may comprise a bore such that the aperture is located in the bore.

Another aspect provides a filter cartridge suitable for translational insertion and rotational engagement of a manifold, the filter cartridge comprising: a cartridge body; a stem extending from the cartridge body, having a first end and a second end, the second end being closer to the cartridge body than the first end, and comprising an inlet opening and an outlet opening and a valve engagement member located at the first end; a filter media disposed within the cartridge body and in fluid communication with the inlet opening and the outlet opening; and one or more retaining members located at the second end of the stem; wherein upon translation insertion of the filter cartridge into the manifold: the valve engagement member engages a portion of the valve body; during a first stage rotation of the filter cartridge about the longitudinal axis of the stem, the one or more retaining members engage a manifold cam; and during a second stage rotation of the filter cartridge about the longitudinal axis of the stem, the valve engagement member imparts rotational movement to the valve body.

In one or more embodiments, the valve engagement member does not impart motion to the valve body during the first stage rotation and the valve engagement member contacts one or more surfaces of a portion of the valve body and imparts rotational movement thereto during the second stage rotation.

An aperture in a stem face located at the first end of the stem may comprise the valve engagement member. The aperture may comprise one or more first valve drive surfaces that impart rotational movement to a portion of the valve body only upon rotation of the filter cartridge in a first direction and one or more second drive valve surfaces that impart rotational movement to a portion of the valve body only upon rotation of the filter cartridge in a second direction that is opposite of the first direction.

The valve engagement member may comprise a surface or a post. The retaining member may comprise a lug. The lug may protrude outwardly from a surface of the stem in a radial direction perpendicular to the longitudinal axis of the stem. The lug may comprise a curved surface facing the cartridge body and a leading engagement edge. The lug may further comprise a trailing edge.

In a further aspect, a fluid filtration system for translational insertion and rotational engagement of a filter cartridge comprises: a manifold assembly comprising: a cartridge opening; an inlet port and an outlet port; a valve having a valve body in a housing; and optionally, a support flange; a filter cartridge comprising: a cartridge body and a stem; a valve engagement member that engages with a projection of the valve body and does not impart motion to the valve body during a first stage rotation and that contacts one or more surfaces of a portion of the valve body and imparts rotational movement thereto during the second stage rotation; and one or more retaining members; wherein the inlet port and outlet port of the manifold assembly are in fluid communication with an inlet opening and an outlet opening, respectively, of the filter cartridge.

The valve engagement member of the filter cartridge may be operatively associated with the valve body during receipt and withdrawal of the filter cartridge from the manifold such that the valve body is moved from a first position to a second position during receipt to put the inlet and outlet ports in fluid communication with the inlet and outlet openings, respectively, and the valve body is moved from the second position to the first position during withdrawal to render no fluid communication between the inlet and outlet ports and the inlet and outlet openings, respectively.

The housing or the support flange when present may comprise one or more manifold cams for engagement with the one or more retaining members of the filter cartridge. The valve body may comprise a vent.

Another aspect is a method of fluid filtration, comprising: obtaining the filter cartridge according to any embodiment disclosed herein; inserting the filter cartridge into a cartridge opening of a manifold with a translational motion; rotating the filter cartridge about the longitudinal axis of the stem to a first stage, thereby engaging the one or more retaining members of the filter cartridge with a manifold cam of the manifold while not imparting motion to the valve body; rotating the filter cartridge about the longitudinal axis of the stem to a second stage, thereby imparting rotational movement to the valve body to permit supply of a fluid to the filter.

The step of rotating the filter cartridge to the first stage may comprise rotating the filter cartridge about 35-45 degrees about the longitudinal axis of the stem and rotating the filter cartridge to the second stage comprises rotating the filter cartridge a further about 50-90 degrees about the longitudinal axis of the stem.

The step of rotating the filter cartridge to the first stage and the second stage may comprise rotating the cartridge in a first direction, the method further comprising: rotating the filter cartridge from the second stage to the first stage by rotating the filter cartridge in a second direction opposite to the first direction about the longitudinal axis of the stem; further rotating the filter cartridge in the second direction, thereby imparting rotational movement to the valve body to block fluid supply to the filter and disengaging the one or more retaining members of the filter cartridge from the housing of the valve; and withdrawing the filter cartridge from the cartridge opening with a translational motion.

Rotating the filter cartridge from the second stage to the first stage may comprise rotating the filter cartridge about 35-45 degrees about the longitudinal axis of the stem and further rotating the filter cartridge in the second direction comprises rotating the filter cartridge a further about 50-90 degrees about the longitudinal axis of the stem.

Other aspects include a method of decreasing axial force on a filter cartridge upon installation into a manifold in a fluid filtration system, the method comprising the steps of: obtaining a filter cartridge that is suitable for a manifold;

wherein a stem of the filter cartridge comprises two openings that permit only radial inlet and outlet flow communication with a filter housed in the filter cartridge and the filter cartridge is secured directly to a housing of the valve at one or more points of contact.

These and other aspects of the invention are described in the detailed description below. In no event should the above summary be construed as a limitation on the claimed subject matter.

BRIEF DESCRIPTION OF THE DRAWINGS

The disclosure may be more completely understood in consideration of the following detailed description of various embodiments of the disclosure in connection with the accompanying drawings, in which:

FIG. 13 is a cross-section of the exemplary filter cartridge and exemplary manifold of FIG. 5 after a fourth stage rotation in a closing direction;

FIG. 14 is a top view of the filter cartridge and manifold of FIG. 13 taken along line e-e;

FIG. 15 is a perspective view of a stem end of another exemplary filter cartridge showing another exemplary valve engagement member;

FIG. 16 is a cut-away perspective view of a valve body showing an exemplary projection suitable for use with the valve engagement member of FIG. 15;

DETAILED DESCRIPTION

Provided are filter cartridges that comprise a valve engagement member, having for example, first and second valve driving surfaces, that are suitable for translational insertion and rotational engagement of a manifold/water valve. The use of two driving surfaces separated by a first timing radial arc allows for some rotation of the cartridge in the manifold when a body of the water valve is not moved. A second timing radial arc between a retaining member and the first valve driving surface allows for a first stage rotation of the filter cartridge about its longitudinal axis such that one or more retaining members of the cartridge engage the manifold housing but the valve body is not opened, and for a second stage rotation of the cartridge about its longitudinal axis such that a valve engagement member of the cartridge imparts rotational movement to the valve body to an open position. The two-stage approach ensures that the cartridge is correctly engaged in the manifold before the valve opens to supply water to the cartridge.

Figure 2:
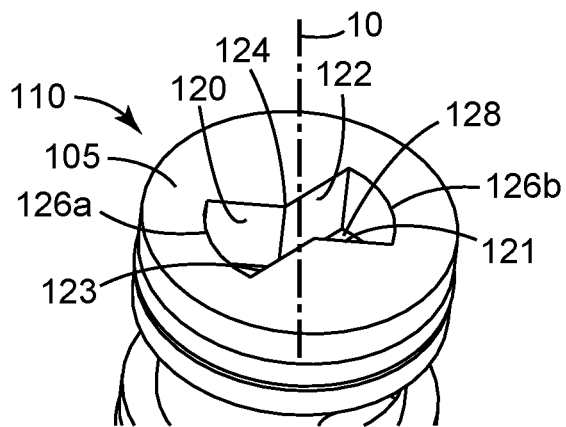
FIG. 2 is an enlarged perspective view of an exemplary valve engagement member of FIG. 1.

Retaining members of the filter cartridge provide structure to secure the filter cartridge to the manifold. In some embodiments, the retaining members engage the filter cartridge with a support flange of the manifold. An exemplary manifold is shown in FIG. 2 of U.S. Pat. No. 6,458,269 (Bassett) having support flange 70, valve member 26, and head portion 20. In other embodiments, the filter cartridge obviates the need for the manifold to have a support flange when the retaining members directly engage with a housing of the manifold.

The following terms shall have, for the purposes of this application, the respective meanings set forth below.

A "first timing radial arc" is defined as the arc in degrees along a perimeter of a stem of the filter cartridge that separates two valve driving surfaces.

A "second timing radial arc" is defined as the arc in degrees along a perimeter of a stem of the filter cartridge that separates the first valve driving surface and the retaining member, specifically a leading edge of the retaining member.

A "first rotational radial arc" is defined as the arc in degrees along a perimeter of the housing of the manifold that the retaining member travels between initial engagement and full engagement with a cam of the manifold.

A "second rotational radial arc" is defined as the arc in degrees along a perimeter of the housing of the manifold that first and second valve driving surfaces travel between a valve fully open position and an initial valve closing position.

A "filter cartridge" or "filter" comprises a filter media for purifying and/or treating fluid disposed in a housing.

A "housing" for the filter comprises a body or sump that is sealed at one end by a cover or by an end cap attached to a filter media.

"Filter media" is a material located in a filter used to purify and/or treat a fluid. The media may provide functionalities including, but not limited to, mechanical filtration, ion exchange, and/or adsorptive capacity. One or more structures, such as end caps, may be associated with the media to direct flow of fluid to be processed through the media and out of the cartridge. In some instances, there is a core or other passage internal to the filter media for fluid flow.

By "filter cap" or "end cap" it is meant a substantially solid piece of material placed at the end of a filter media such as a media block, which is dimensioned so as to at least seal the greater portion of the surface area of one or both ends of the filter. In some embodiments, the end cap may have a port or an opening to allow fluid flow into or from a core of the filter. End caps on either end of a media cartridge may independently have additional features to facilitate installation and/or use of the media within a body or sump of a housing.

"Filtered fluid" and "filtered water" refer to fluid and water that have contacted the filter media to achieve a desired purity or treatment.

"Fluid communication" refers to the ability of a fluid to flow between two points including in the presence of valves that may be opened and closed.

A "retaining member" is a structure of a first item that interconnects or mates with a corresponding structure of another item, and is capable of applying a force to retain the first item within, adjacent to, or around the other item. Exemplary retaining members include, but are not limited to, lugs, threads, or other protruding structures from the filter cartridge that interconnect or mate with cams, threads, or other suitable structures in the manifold. It is also recognized that a retaining member may be formed in the subsurface of the filter cartridge, in which was, the corresponding structure of the manifold would likely be a corresponding protrusion.

A "valve engagement member" is a structure of a filter cartridge that provides one or more surfaces for engaging and applying a force to rotate one or more components within a manifold. Such surfaces can be located at or near a stem face of the filter cartridge, such as protruding outwardly from the stem face or located within an aperture in the stem face.

Filter Media

Suitable types of filter media include but are not limited to those that provide separation of impurities from a fluid and those that provide treatment to a fluid and combinations thereof. Media that may be used individually or in any combination are provided in the following.

The media may be materials called adsorbents that an ability to adsorb particles via different adsorptive mechanisms. Adsorption is a surface phenomenon, where atoms or ions adhere to a surface of an adsorbent. The media may be in the form of, for example, spherical pellets, rods, fibers, molded particles, or monoliths with hydrodynamic diameter between about 0.01 to 10 mm. If such media is porous, this attribute results in a higher exposed surface area and higher adsorptive capacity. The adsorbents may have combination of micropore and macropore structure enabling rapid transport of the particles and low flow resistance. Adsorbent particles may be selected from the group consisting of activated carbon, diatomaceous earth, ion exchange resin, metal ion exchange sorbent, activated alumina, antimicrobial compound, acid gas adsorbent, arsenic reduction material, iodinated resin, and combinations thereof.

The media may be particles contained loosely or particles formed into a media block. For example, media comprising activated carbon particles and polymeric binder particles may form a carbon-based filter block. Fluid contacting a carbon-based media, for example, may achieve a reduction in sediment, chlorine, and lead. Fluid contacting a weak acid cation (WAC) exchange resin may achieve a reduction in hardness. Ion-exchange resin may be provided alone or located in a core of a filter block. A nonwoven material may be wrapped around a filter block.

Some suitable media may also be cellulosic media, synthetic media, or a combination thereof. The media may include structures, pleated or unpleated, including, but not limited to: a woven structure, a non-woven structure, a microporous membrane or composite, a monolith, a meltblown fiber (MBF) structure, a hollow-fiber membrane, and an open-cell foam. Exemplary materials of construction of these structures may include, but are not limited to: nylon (e.g., nylon 6,6), ethylene chlorotrifluoroethylene (ECTFE), polypropylene, polyethylene, polyvinylidene fluoride (PVDF), polyethersulfone, polysulfone, polyester, polytetrafluoroethylene (PTFE), polycarbonate, nitrocellulose, cellulose acetate, cellulose, or combinations thereof.

Before describing several exemplary embodiments of the invention, it is to be understood that the invention is not limited to the details of construction or process steps set forth in the following description. The invention is capable of other embodiments and of being practiced or being carried out in various ways.

Figure 1:
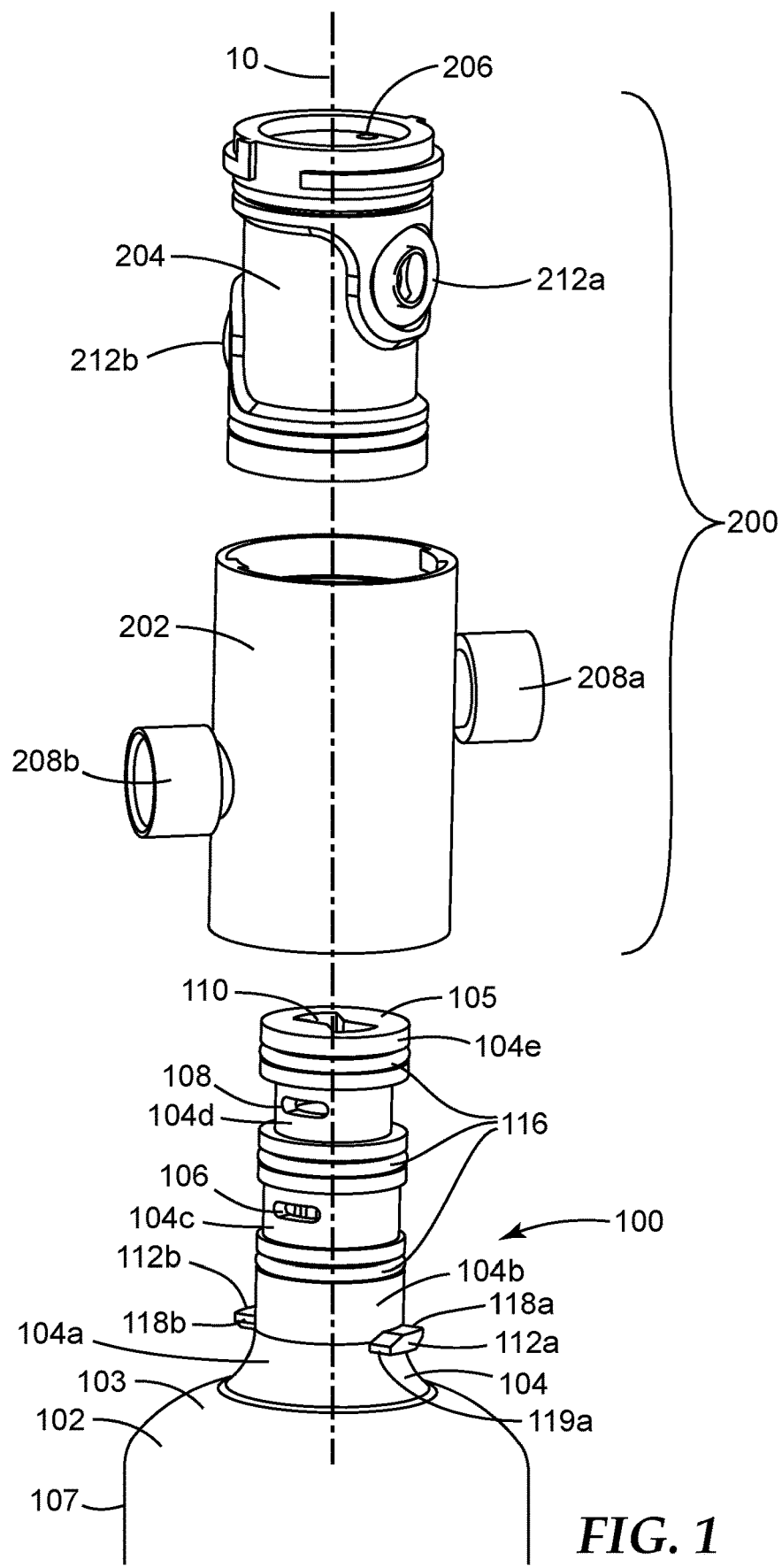
FIG. 1 is an exploded perspective view of a manifold and filter cartridge in accordance with an embodiment.

Turning to the figures, FIG. 1 provides an exploded perspective view of a manifold 200 and filter cartridge 100 in accordance with an embodiment. Manifold 200 comprises a housing (or outer valve) 202 for a valve body (or inner valve) 204. Manifold 200 does not have a support flange. Manifold 200 is designed to be part of a fluid filtration system to which water would be supplied. Manifold 200 does not comprise a support flange. Upon assembly of the valve body 204 into the housing 202, flow channels 212a, 212b, which are openings from an outer surface to an inner surface of the valve body 204, are in fluid communication with the inlet and outlet ports 208a, 208b, which are flow passages from an outer surface to an inner surface of the housing 202, when the valve body 204 is in an open position. Flow channels 212a, 212b are not in fluid communication with the inlet and outlet ports 208a, 208b when the valve body 204 is in a closed position and the inlet and outlet ports 208a, 208b are blocked by the surface of the valve body. Vent 206 facilitates insertion of filter cartridge 100 into manifold 200. Filter cartridge 100 comprises a cartridge body 102, which is often generally cylindrical in shape, and a stem 104 extending longitudinally from the cartridge body 102. The cartridge body 102 has a shoulder 103 disposed substantially laterally between a generally cylindrical sump 107 that contains filter media and the stem 104. The diameter of the stem 104 is less than the diameter of the sump 107. Stem 104 may comprise segments of different diameters and surface features, for example stem neck 104a is proximate to shoulder 103; lower portion 104b is disposed between stem neck 104a and the lowermost O-ring; middle portion 104c, whose surface contains inlet opening 106, is disposed between the lowermost and middle O-rings; upper portion 104d, whose surface contains outlet opening 108, is disposed between the middle and uppermost O-rings; and stem tip 104e is above the uppermost O-ring, distal to shoulder 103. Longitudinal axis 10 is shown lengthwise down the centers of the manifold 200 and the filter cartridge 100. The stem 104 has an inlet opening 106 and an outlet opening 108, and a stem face 105 on its distal end comprising a valve engagement member 110. Valve engagement member 110 in this embodiment, which will be discussed further with respect to FIG. 2, is in an aperture in the stem face 105 comprising surfaces that extend longitudinally below the stem face 105 to the interior of the stem.

Also in this embodiment, the inlet opening 106 and the outlet opening 108 permit the entry and exit, respectively, of a fluid in one or more radial directions perpendicular to the longitudinal axis of the stem. Filter media in the sump 107 of the cartridge body 102 is chosen to meet a desired water treatment and/or purification need. Retaining members 112a, 112b are attached to a surface of the stem 104 at generally opposite locations. The retaining members 112a, 112b of the embodiment of FIG. 1 protrude substantially laterally from the stem 104, each respectively having a leading engagement edge 118a, 118b, and a trailing edge 119a, 119b. FIGS. 41-44 set forth various designs in further detail. O-rings 116 are located along the stem 104 at locations above the outlet opening 108, between the inlet opening 106 and the outlet opening 108, and below the inlet opening 106. The O-rings ensure segregation of incoming untreated water from treated outgoing water.

FIG. 2 provides an enlarged perspective view of an exemplary valve engagement member 110 of FIG. 1 located in an aperture 128 of stem face 105. While the overall shape of the valve engagement member 110 may be designed to meet the needs of a customer, the valve engagement member has at least a first valve driving surface and a second valve driving surface. In the embodiment of FIG. 2, the valve engagement member 110 comprises first valve driving surfaces 120 and/or 121 and second valve driving surfaces 122 and/or 123, which are disposed in the aperture 128. The shape of the perimeter of the aperture represents the edges of intersection of the stem face 105 with the flat first valve driving surfaces 120 and/or 121 and second valve driving surfaces 122 and/or 123 and with the flat arcuate outer portions 126a, 126b. The first valve driving surfaces 120 and/or 121 are used to move a portion of the valve body in a first direction and the second valve driving surfaces 122 and/or 123 are used to move a portion of the valve body in a second direction. In this embodiment, the first valve driving surfaces 120, 121 and second valve driving surfaces 122, 123 are substantially parallel to the longitudinal axis 10 and have mirror symmetry. In the embodiment of FIG. 2, a central area 124 is located midway between outer portions 126a, 126b; the central area 124 has a width that is narrower than widths of the outer portions 126a, 126b.

Figure 3:
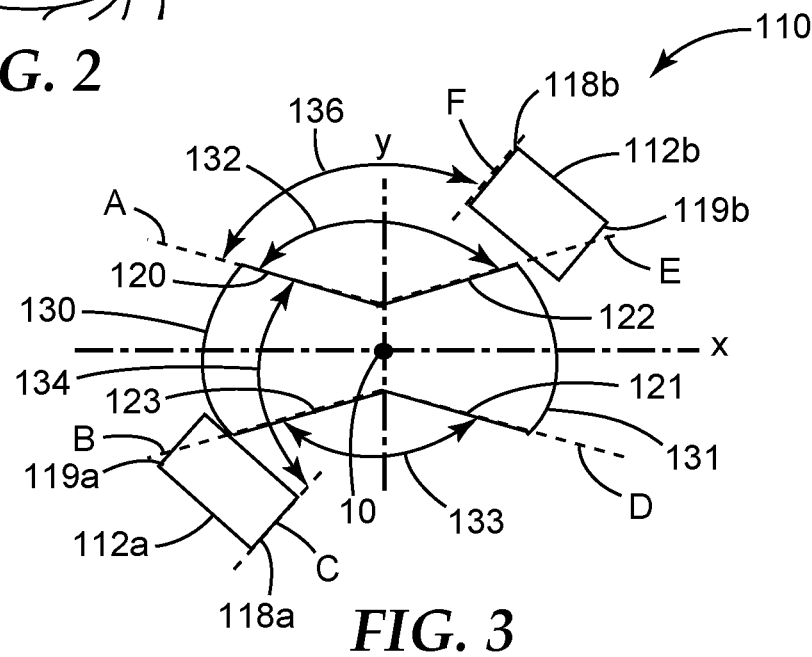
FIG. 3 is an annotated top view of the valve engagement member of FIG. 1.

Regarding the valve driving surfaces, the filter cartridges have at least two such surfaces. One for moving a portion of the valve body in a first direction (for example, to a valve-open position) and one for moving a portion of the valve body in a second direction (for example, to a valve-closed position). FIG. 3 is an annotated top view of the valve engagement member 110 of FIG. 1 with respect to retaining members 112a, 112b. In FIG. 3, opposing surfaces are shown by the combinations of surfaces 120 and 123 and of surfaces 121 and 122, that is, each pair is located on the same side of the y-axis while being divided by the x-axis. Specifically, the first valve driving surface 120 and the second valve driving surface 123 are opposing, and the first timing radial arc 130 is defined as the degrees between "A" and "B". "A" and "B" are taken from lines tangent to the point(s) of the surface that will be in point contact with a portion of the valve. Likewise, the first valve driving surface 121 and the second valve driving surface 122 are opposing and the first timing radial arc 131 is defined as the degrees between "D" and "E" and "D" and "E" are taken from lines tangent to the point(s) of the surface that will be in point contact with a portion of the valve. Accordingly, "A", "B", "D", "E", etc. are taken from lines tangent to the point(s) of the surface that will be in point contact with a portion of the valve, and in situations for which the first and/or second valve driving surfaces are planes that provide multiple points of contact, "A", "B", "D", "E", etc. may be taken from a line that is coplanar with the valve driving surface. In one or more embodiments, the first timing radial arc 130 or 131 where the surfaces are opposing is in the range of about 10-40 degrees to about 80-110 degrees (or even about 50 to degrees to about 100 degrees, or even about 60 degrees to about 90 degrees or even about 70 degrees to about 80 degrees). In a detailed embodiment, the first timing radial arc 130 where the surfaces are opposing is 75 degrees.

In FIG. 3, complementary surfaces are shown by the combinations of surfaces 120 and 122 and of surfaces 121 and 123, that is, each pair is located on the same side of the x-axis while being divided by the y-axis. Specifically, the first valve driving surface 120 and the second valve driving surface 122 are complementary and the first timing radial arc 132 is defined as the degrees between "E" and "A". "E" and "A" are taken from lines tangent to the point(s) of the surface that will be in point contact with a portion of the valve. Likewise, the first valve driving surface 121 and the second valve driving surface 123 are complementary and the first timing radial arc 133 is defined as the degrees between "B" and "D", and "B" and "D" are taken from lines tangent to the point(s) of the surface that will be in point contact with a portion of the valve. In one or more embodiments, the first timing radial arc 132 or 133 where the surfaces are complementary is in the range of about 70-100 degrees to about 140-170 degrees (or even about 80 to degrees to about 130 degrees, or even about 90 degrees to about 120 degrees or even about 100 degrees to about 110 degrees). In a detailed embodiment, the first timing radial arc 130 where the surfaces are complementary is about 105 degrees.

The at least two valve driving surfaces therefore are at least (1) opposing, which means on opposite sides of an x-axis of the valve engagement member or (2) complementary, which means on the same side of the x-axis but not necessarily in contact with each other. Having more than two valve driving surfaces means that such surfaces may be both opposing and complementary. When there are both opposing and complementary valve driving surfaces, the first timing radial arc with respect to opposing surfaces will be used.

A second timing radial arc 134 is defined as the degrees between location "C" at the leading engagement edge 118*a* and location "A" at the first valve driving surface. "A" is taken from the line tangent to the point(s) of the surface that will be in point contact with the valve engagement member. "C" is taken from the line tangent to the first point(s) of the leading engagement edge that will engage with a manifold cam. Likewise, a second timing radial arc 136 is defined as the degrees between location "F" at the leading engagement edge 118*b* and location "A" at the first valve driving surface. "A" is still taken from the line tangent to the point(s) of the surface that will be in point contact with the valve engagement member, and "F" is taken from the line tangent to the first point(s) of the leading engagement edge that will engage with a manifold cam. Other similar second timing radial arcs can be defined between location "C" at the leading engagement edge 118*a* and location "D" at the first valve driving surface and/or location "F" at the leading engagement edge 118*b* and location "D" at the first valve driving surface. In one or more embodiments, the second timing radial arc 134 where the surfaces are opposing is in the range of about 0 degrees to about 180 degrees (or even about 45 to degrees to about 90 degrees, or even about 75 degrees). In one or more embodiments, the second timing radial arc 136 where the surfaces are complementary is in the range of about 0 degrees to about 180 degrees (or even about 110 to degrees to about 160 degrees, or even about 135 degrees).

Figure 4:
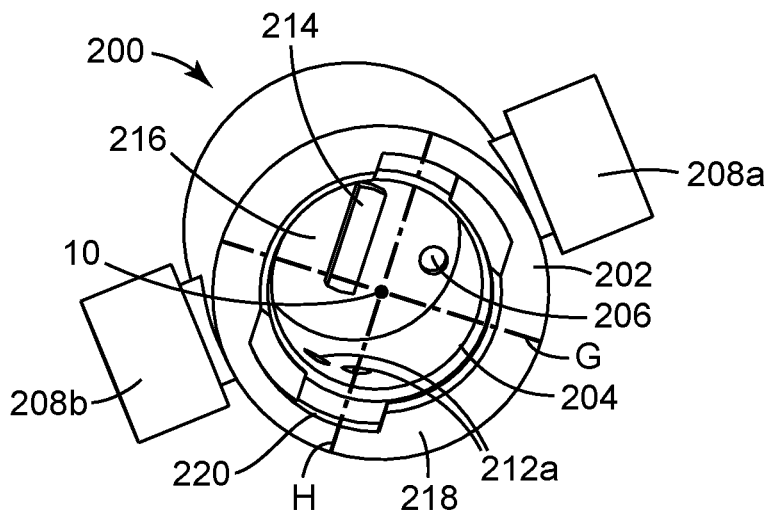
FIG. 4 is a perspective view into an exemplary manifold/water valve.

FIG. 4 provides a perspective view into an exemplary manifold/water valve 200, which does not have a support flange. Cartridge opening 216 receives a stem of a cartridge filter. The valve body (or inner valve) 204 is located in the housing (or outer valve) 202. The housing has inlet and outlet ports 208*a*, 208*b*, respectively. Flow channels 212*a* (and 212*b* not shown in this view) are in fluid communication with the inlet and outlet ports 208*a*, 208*b* when the valve body 204 is in an open position. Flow channels 212*a*, 212*b* are not in fluid communication with the inlet and outlet ports 208*a*, 208*b*, respectively, when the valve body is in a closed position. A vent 206 is in the valve body 204 for relieving any pressure build-up. The valve body 204 also has a portion 214 that is engagable with the valve engagement member of the filter cartridge. In the embodiment of FIG. 4, the portion 214 is a projection, which is dimensioned to fit into a valve engagement member and to provide surfaces for the valve engagement member to contact. The projection in this embodiment comprises two flat sides that define the length of the projection, the two flat sides being connected by a flat face which defines a width of the projection and at each end the flat sides are connected by an arcuate surface. The housing 202 has an insertion gap 220. A retaining member of the filter cartridge is inserted into the insertion gap 220. Upon rotation of the filter cartridge, the retaining member initially engages with a manifold cam until it is fully engaged. The arc between "G" and "H" is defined as a rotational arc 218.

Figure 5:
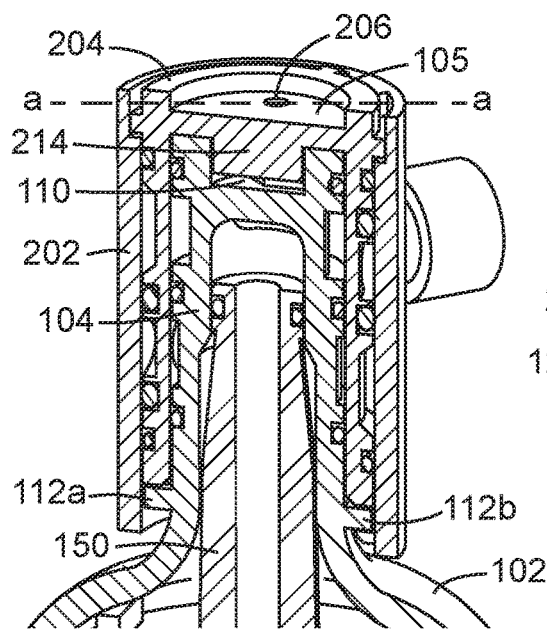
FIG. 5 is a cross-section of an exemplary filter cartridge according to FIGS. 1-2 being inserted into an exemplary manifold according to FIGS. 1 and 4.
Figure 6:
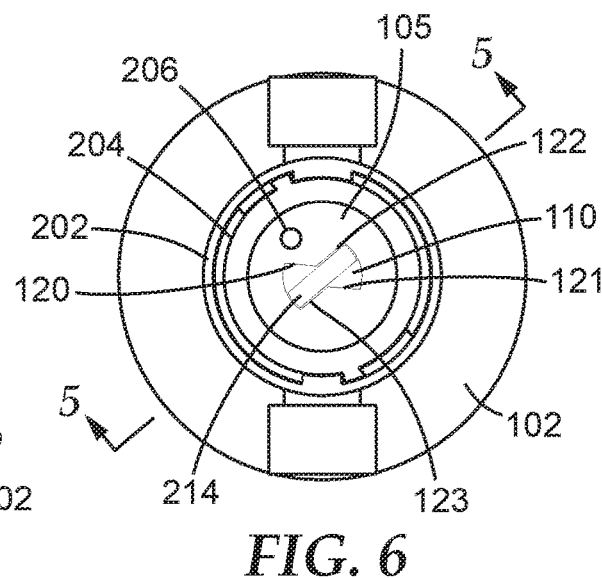
FIG. 6 is a top view of the filter cartridge and manifold of FIG. 5 taken along line a-a.
Figure 7:
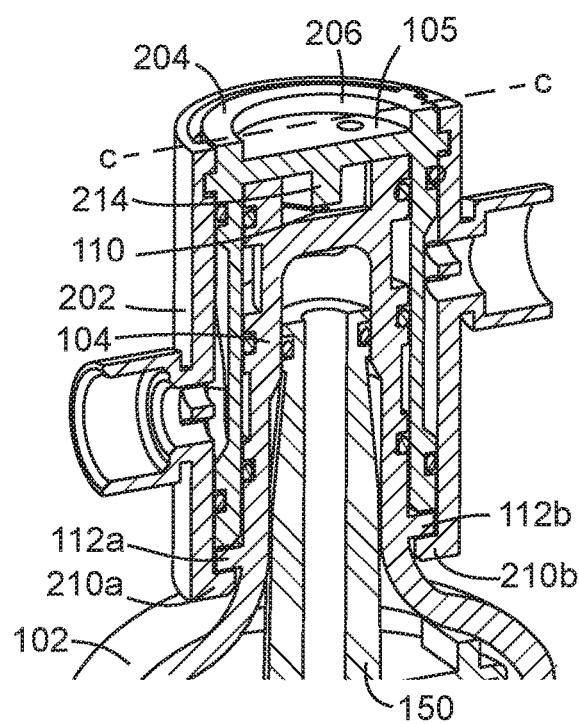
FIG. 7 is a cross-section of the exemplary filter cartridge and exemplary manifold of FIG. 5 after a first stage rotation in an opening direction.

In FIGS. 5-14, the progression of inserting and removing the exemplary filter cartridge of FIGS. 1-2 from an exemplary manifold according to FIGS. 1 and 4 is provided. Starting with "Step 1," FIGS. 5-6 show the location of the filter cartridge relative to the manifold upon insertion of the filter cartridge into the manifold. At this point, the valve body is in a closed position and water is not supplied to the manifold/filter cartridge. In the cross-section view of FIG. 5, stem 104 extending from cartridge body 102 enters the manifold comprising the valve body 204 and the housing of the valve 202 by way of the cartridge opening (item 216 of FIG. 4). End cap 150 attached to a filter media (not shown) in the cartridge body 102 extends into the stem 104. Retaining members 112*a*, 112*b* enter insertion gaps (item 220 of FIG. 4). The projection 214 of the valve body 204 is then disposed in the valve engagement member 110 located in stem face 105. Vent 206 through the valve body 204 is also shown. FIG. 6 provides a top view of the filter cartridge and manifold of FIG. 5 taken along line a-a, where the projection 214 of the valve body 204 is positioned in the valve engagement member 110 located in the stem face 105. First valve driving surfaces 120 and 121 are generally not in contact with the projection 214. Second valve driving surfaces 122 and 123 are near, and optionally in contact with, the projection 214.

Figure 8:
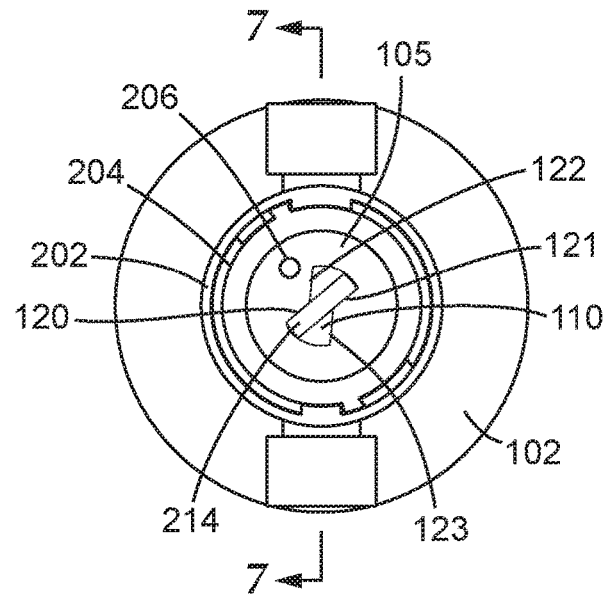
FIG. 8 is a top view of the filter cartridge and manifold of FIG. 7 taken along line b-b.

"Step 2" is a first stage rotation in a valve opening direction, which for this example is counter-clockwise. The filter cartridge of FIGS. 7-8 has been rotated 45 degrees counter-clockwise relative to Step 1 where leading engagement edges of retaining members 112*a*, 112*b* first contact the manifold cams, followed by lower camming surfaces of the retaining members 112*a*, 112*b* that ride the manifold cam, which is described in more detail with respect to FIG. 20 and FIG. 41. In Step 2, the valve body remains in a closed position and water is still not supplied to the manifold/filter cartridge. In the cross-section view of FIG. 7, retaining members 112*a*, 112*b* engage with manifold cams 210*a*, 210*b* thereby locking the filter cartridge into the manifold. The valve engagement member 110 located in stem face 105 of stem 104 rotates without engaging the projection 214 of the valve body 204. FIG. 8 provides a top view of the filter cartridge and manifold of FIG. 7 taken along line b-b, where the position of the projection 214 is the same in Step 2 as it was in Step 1, and the valve engagement member 110 has rotated 45°. First valve driving surfaces 120 and 121 are near, and generally come into contact with, the projection 214. Second valve driving surfaces 122 and 123 are not in contact with the projection 214.

Figure 9:
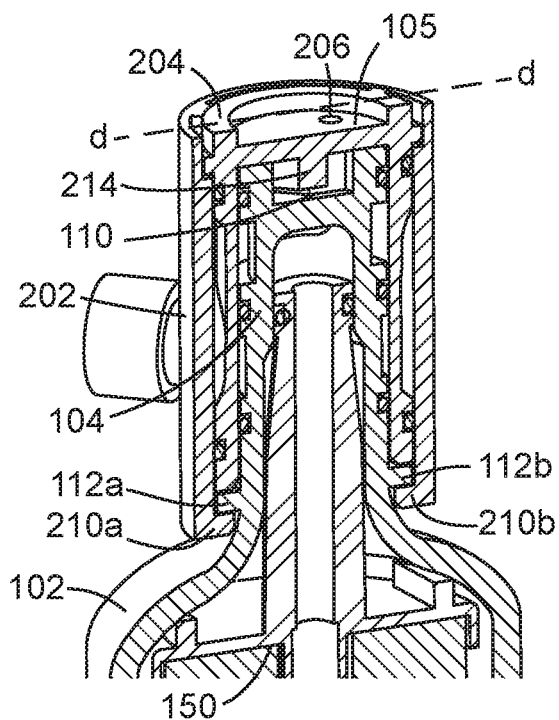
FIG. 9 is a cross-section of the exemplary filter cartridge and exemplary manifold of FIG. 5 after a second stage rotation in the opening direction.
Figure 10:
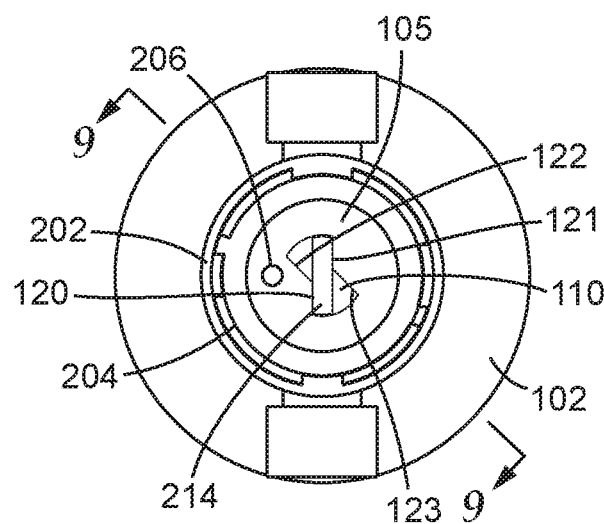
FIG. 10 is a top view of the filter cartridge and manifold of FIG. 9 taken along line c-c.
Figure 11:
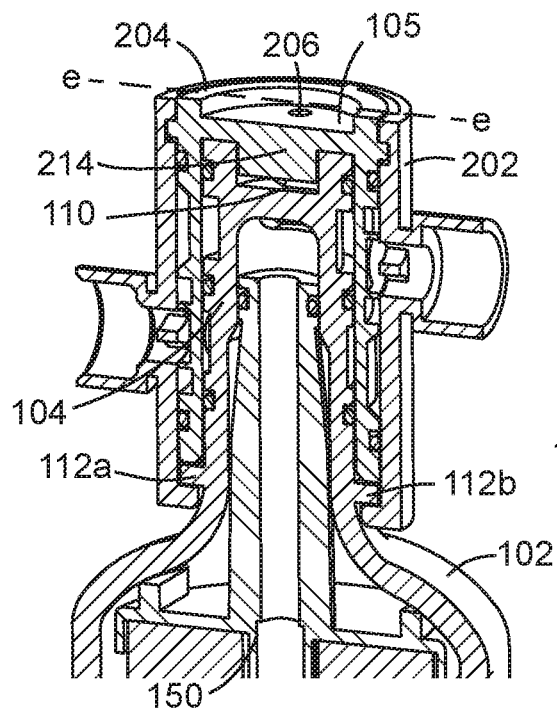
FIG. 11 is a cross-section of the exemplary filter cartridge and exemplary manifold of FIG. 5 after a third stage rotation in a closing direction.
Figure 22:
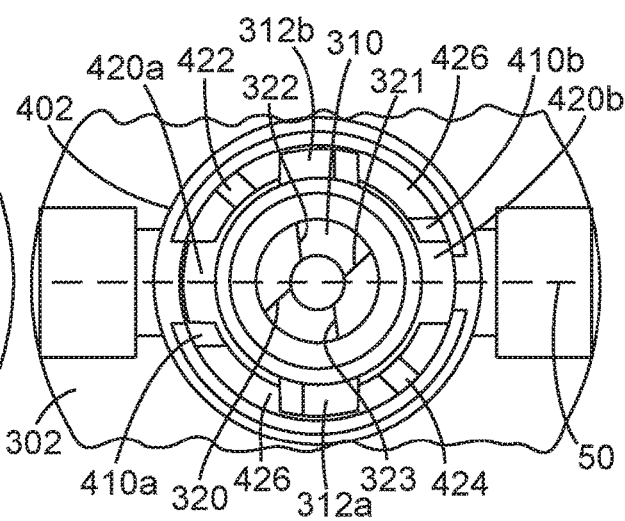
FIG. 22 is the top view according to FIG. 18 after a second stage rotation in the opening direction.

In "Step 3," which is a second stage rotation in the valve opening direction, after a further 50 degree rotation counter-clockwise of the filter cartridge relative to Step 2 while the lower camming surfaces of the retaining members 112*a*, 112*b* continue to ride the manifold cam as discussed in detail with respect to FIG. 22, the valve body is moved into an open position and water is supplied to the manifold/filter cartridge. The filter is fully installed in Step 3. FIGS. 9-10 show the location of the filter cartridge relative to the manifold. In the cross-section view of FIG. 9, retaining members 112a, 112b remain engaged with manifold cams 210a, 210b. The first valve driving surfaces 120 and 121 are engaged with the projection 214. FIG. 10 provides a top view of the filter cartridge and manifold of FIG. 9 taken along line c-c, where the positions of the projection 214 and the valve engagement member 110 are now rotated 50°. The first valve driving surfaces 120 and 121 have engaged with the projection 214, which results in rotating the valve body 204 to an open position. At this point, water may flow freely into the filter cartridge by way of its inlet opening. The second valve driving surfaces 122 and 123 are still not in contact with the projection 214.

Figure 12:
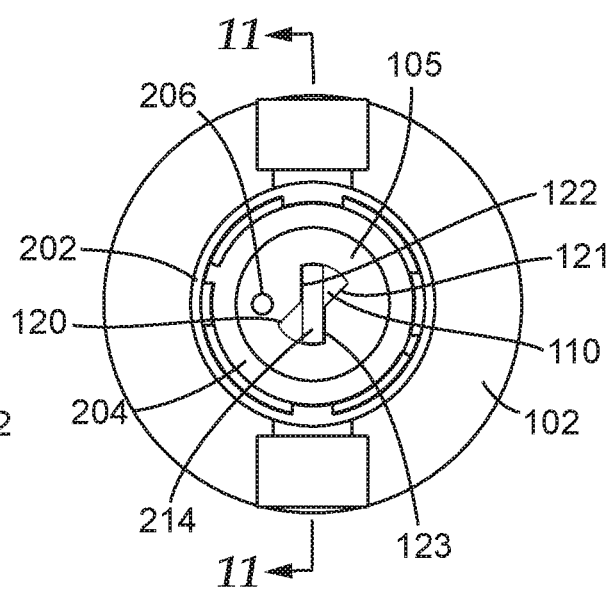
FIG. 12 is a top view of the filter cartridge and manifold of FIG. 11 taken along line d-d.

"Step 4" is a third stage rotation in a valve closing direction, which for this example is clockwise. The filter cartridge of FIGS. 11-12 has been rotated 45 degrees clockwise relative to Step 3, the lower camming surfaces of the retaining members 112a, 112b riding the manifold cam in the direction opposite of Step 3 as discussed in detail with respect to FIG. 24. Water is still being supplied to the filter cartridge in this step. In the cross-section view of FIG. 11, retaining members 112a, 112b remain engaged with manifold cams 210a, 210b. The first valve driving surfaces 120 and 121 no longer engage the projection 214. FIG. 12 provides a top view of the filter cartridge and manifold of FIG. 11 taken along line d-d, where the position of the valve engagement member 110 is now rotated clockwise 45°. The first valve driving surfaces 120 and 121 are no longer engaged with the projection 214. The second valve driving surfaces 122 and 123 come into contact with the projection 214.

Figure 26:
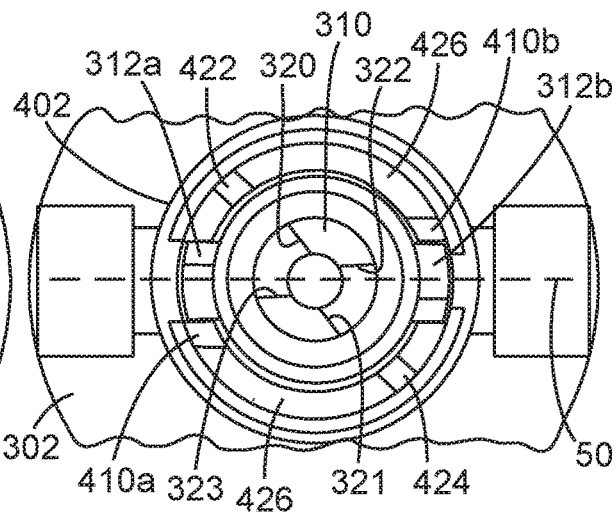
FIG. 26 is the top view according to FIG. 18 after a fourth stage rotation in the closing direction.

In "Step 5," which is a fourth stage rotation in the valve closing direction, after a further 50 degree rotation clockwise of the filter cartridge relative to Step 4 where trailing edges of retaining members 112a, 112b first disengage from the manifold cams as discussed in detail with respect to FIG. 26, the valve body is moved into a closed position and water is no longer supplied to the manifold/filter cartridge. FIGS. 13-14 show the location of the filter cartridge relative to the manifold. In the cross-section view of FIG. 13, retaining members 112a, 112b have disengaged from the cams. The second valve driving surfaces 122 and 123 remain engaged with the projection 214. FIG. 14 provides a top view of the filter cartridge and manifold of FIG. 13 taken along line e-e, where the positions of the projection 214 and the valve engagement member 110 are now rotated 50° clockwise. The second valve driving surfaces 122 and 123 have engaged with the projection 214, which results in rotating the valve body 204 to a closed position. At this point, water does not flow into the filter cartridge, the retaining members are no longer engaged with the cams, and the filter cartridge can be removed from the manifold. The first valve driving surfaces 120 and 121 are still not in contact with the projection 214. The filter cartridge is removable from the manifold in Step 5 by pulling the filter cartridge in a longitudinal direction to remove the stem from the valve body.

FIG. 15 provides a perspective view of a stem end of filter cartridge 300 showing another exemplary valve engagement member 310 located in an aperture 328 of stem face 305. In the embodiment of FIG. 15, stem 304 comprises a bore 360 such that aperture 328 having valve engagement member 310 is below the surface of the stem face 305. The bore 360 in this embodiment has a generally cylindrical shape, having a first depth, "$d_1$" below the surface of the stem face 305. The valve engagement member 310 having a depth "$d_2$" below the bore 360 comprises first valve driving surfaces 320 and 321 and second valve driving surfaces 322 and 323 and recess 362, which are disposed in the aperture 328. The shape of the perimeter of the aperture 328 represents the edges of intersection of the bore 360 with the flat first valve driving surfaces 320 and/or 321 and second valve driving surfaces 322 and/or 323 and with the flat arcuate outer portions 326a, 326b and a central area which has a first flat arcuate surface 327 disposed between first valve driving surface 320 and second valve driving surface 323 and a second flat arcuate surface 325 disposed between first valve driving surface 321 and second valve driving surface 322. A first top face 311 of the valve engagement member is perpendicular to the first valve driving surface 320, the second valve driving surface 323, and the arcuate surface 327. A second top face 313 of the valve engagement member is perpendicular to the first valve driving surface 321, the second valve driving surface 322, and the arcuate surface 325. The first valve driving surfaces 320 and 321 are used to move a portion of the valve body in a first direction and the second valve driving surfaces 322 and/or 323 are used to move a portion of the valve body in a second direction. In this embodiment, the first valve driving surfaces 320, 321 and second valve driving surfaces 322, 323 are substantially parallel to the longitudinal axis 10 and have mirror symmetry. In the embodiment of FIG. 15, a central area 324 is located midway between outer portions 326a, 326b; the central area 324 has a width that is narrower than widths of the outer portions 326a, 326b. Recess 362 has a generally cylindrical shape and a depth "$d_3$" below the valve engagement member 320. Recess 362 may be formed into any suitable shape to mate with features of the valve body in a lock and key configuration.

FIG. 16 provides a cut-away perspective view of a valve body showing an exemplary projection suitable for use with the valve engagement member of FIG. 15. Valve body 404 comprises a bushing 438 that mates with bore 360 (of FIG. 15) and a portion 414 that is engagable with, for example, the valve engagement member of FIG. 15. The bushing 438 is generally cylindrical extending in an axial direction from the valve body 404 and having a nominal depth of "$d_1$" from the inner surface 403 of the valve body 404. In the embodiment of FIG. 16, extending from the bushing 438 is the portion 414 in the form of a projection comprises features that mate with the valve engagement member of FIG. 15: stem 430 and wings 432a, 432b, which together generally form a keystone shape. The stem 430 is generally cylindrical having an elongate body (of nominal length "$d_2$"+"$d_3$") and a face, which has a diameter that is smaller than the diameter of the bushing 438. Extending from the body of the stem 430 are wings 432a, 432b having a nominal thickness (or depth from bushing 438) of "$d_2$". The wings 432a, 432b are generally wedge-shaped, each having two flat sides that angle out from the body of the stem 430 that are connected by an arcuate surface. A face of each wing 432a, 432b is perpendicular to each flat side and arcuate surface. The stem 430 is matable with the recess 362 of FIG. 15, serving as a mechanical key. While in this embodiment, the stem and recess have a generally circular shape, it is understood that custom shapes may be chosen to differentiate between customers and/or system designs and/or functionality of the filter. That is, geometries such as square, rectangular, star, oval, trapezoidal, conical, triangular, and the like may be used. The wings 432a, 432b fit into aperture 428, which is the area formed by outer portions 326a, 326b of FIG. 15.

The wings 432a, 432b have first movement surfaces 434 and 435, respectively, and second movement surfaces 437 and 436, respectively, that during use, engage, respectively during the appropriate step as discussed above, with the first valve driving surfaces 320, 321 and second valve driving surfaces 322, 323 of FIG. 15.

In FIGS. 17-26, the progression of inserting and removing the stem end of FIG. 15 from the valve body according to FIG. 16 is provided. The view of valve body 404 is taken along line f-f of FIG. 16, which is located between bushing 438 and wings 432. Centerline 50 is provided as a reference point in FIGS. 17-26.

Figure 17:
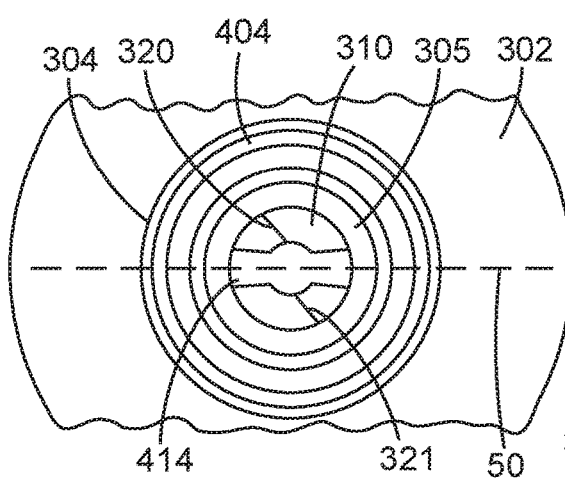
FIG. 17 is a top view of the valve body of FIG. 16 taken along line f-f in combination with the stem end of FIG. 15 upon insertion of the stem end into the valve body.
Figure 18:
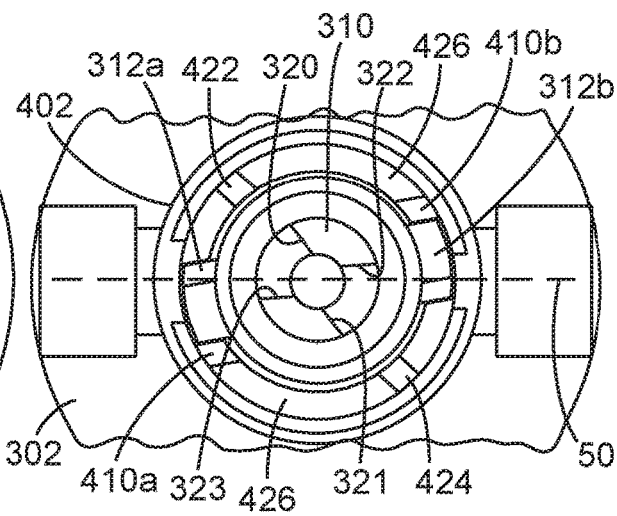
FIG. 18 is a top view of an exemplary housing of valve in combination with the stem end of FIG. 15 upon insertion of the stem end into the valve body.

Starting with "Step 1," FIGS. 17 and 18 show the same view and position of the filter cartridge, where FIG. 17 provides the positioning of the valve engagement member 414 relative to the valve body 404 (housing is not shown) and FIG. 18 provides positioning of the retaining members 312a, 312b relative to the housing of the valve 402 (valve body is not shown). In the position of FIG. 17, the first driving surfaces 320, 321 of valve engagement member 310 in stem face 305 are generally not in contact with the projection 414 of the valve body 404 upon insertion of the filter cartridge into the manifold. Because this is a top view, the cartridge body 302 and a small portion of the stem 304 are shown. In Step 1, the valve body 404 is in a closed position and water is not supplied to the manifold/filter cartridge. Second valve driving surfaces (not numbered in FIG. 17 but identified in FIG. 18 as 322 and 323) are near, and optionally in contact with, the projection 214. In FIG. 18, cartridge body 302 is shown. Retaining members 312a, 312b are positioned in insertion gaps (not numbered in FIG. 18 but identified in FIG. 20 as 420a, 420b) of the housing 402. At this point, the retaining members 312a, 312b have not yet engaged with cams 410a, 410b. Housing 402 comprises threads 426 adjacent to the cams 410a, 410b. Stops 422, 424 are located adjacent to the threads at an end opposite to that of the cams.

Figure 19:
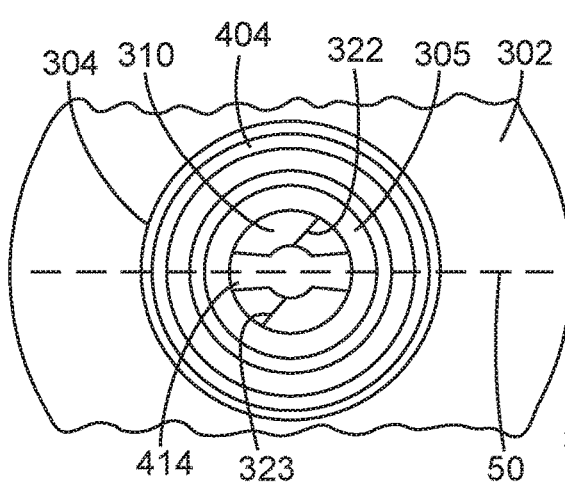
FIG. 19 is the top view according to FIG. 17 after a first stage rotation in an opening direction.
Figure 20:
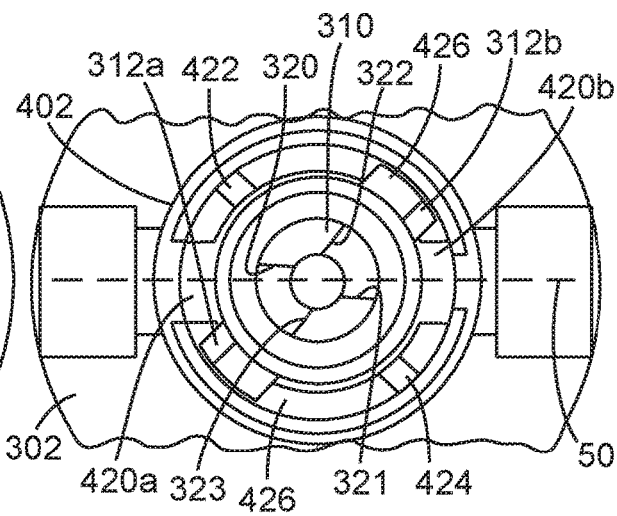
FIG. 20 is the top view according to FIG. 18 after a first stage rotation in an opening direction.

"Step 2" is a first stage rotation in a valve opening direction, which for this example is counter-clockwise. The filter cartridge of FIGS. 17-18 has been rotated 45 degrees counter-clockwise relative to Step 1. FIGS. 19 and 20 show the same view and position of the filter cartridge, where FIG. 19 provides the positioning of the valve engagement member relative to the valve body (housing is not shown) and FIG. 20 provides positioning of the retaining members relative to the housing of the valve (valve body is not shown). In Step 2, the valve body 404 remains in a closed position and water is still not supplied to the manifold/filter cartridge. Because this is a top view, the cartridge body 302 and a small portion of the stem 304 are shown. The position of the projection 414 is the same in Step 2 as it was in Step 1, and the valve engagement member 310 has rotated 45° without engaging the projection 414. First valve driving surfaces (not numbered in FIG. 19 but identified in FIG. 20 as 320 and 321) are near, and generally come into contact with, the projection 414. Second valve driving surfaces 322 and 323 are not in contact with the projection 414. In FIG. 20, cartridge body 302 is shown. Retaining members 312a, 312b engage with cams (not numbered in FIG. 20 but identified in FIG. 18 as 410a, 410b) and optionally to some extent with the threads 426 thereby locking the filter cartridge into the manifold. Insertion gaps 420a, 420b of the housing 402 are now exposed.

Figure 21:
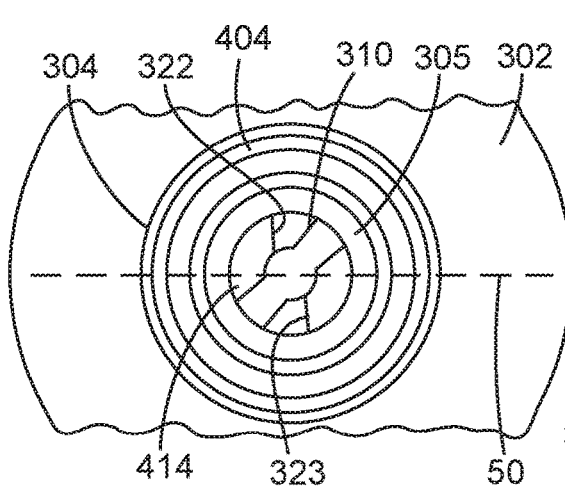
FIG. 21 is the top view according to FIG. 17 after a second stage rotation in the opening direction.

In "Step 3," which is a second stage rotation in the valve opening direction, after a further 50 degree rotation counter-clockwise of the filter cartridge relative to Step 2, the valve body is moved into an open position and water is supplied to the manifold/filter cartridge. The filter is fully installed in Step 3. FIGS. 21 and 22 show the same view and position of the filter cartridge, where FIG. 21 provides the positioning of the valve engagement member relative to the valve body (housing is not shown) and FIG. 22 provides positioning of the retaining members relative to the housing of the valve (valve body is not shown). In Step 3, the first valve driving surfaces (not numbered in FIG. 21 but identified in FIG. 22 as 320 and 321) are engaged with the projection 414, which results in rotating the valve body 404 to an open position. At this point, water may flow freely into the filter cartridge by way of its inlet opening. The second valve driving surfaces 322 and 323 are still not in contact with the projection 414. Because this is a top view, the cartridge body 302 and a small portion of the stem 304 are shown. Second valve driving surfaces 322 and 323 are still not in contact with the projection 414. In FIG. 22, cartridge body 302 is shown. Retaining members 312a, 312b have moved past cams 410a, 410b and traveled along threads 426. Generally, it is not expected that the retaining members 312a, 312b make contact with stops 422, 424 during normal use. Stops 422, 424, however, are provided to prevent over-rotation of the filter cartridge.

Figure 23:
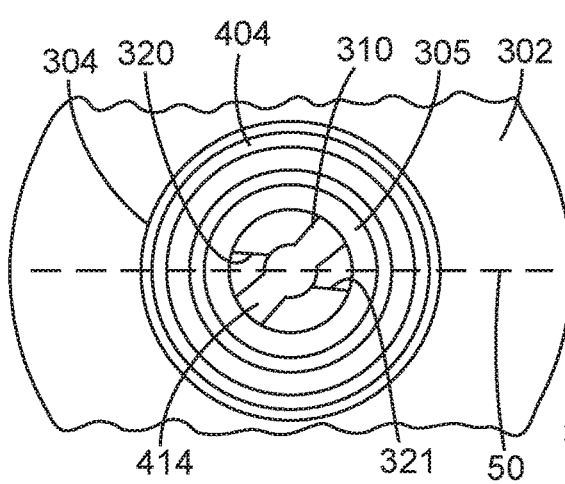
FIG. 23 is the top view according to FIG. 17 after a third stage rotation in a closing direction.
Figure 24:
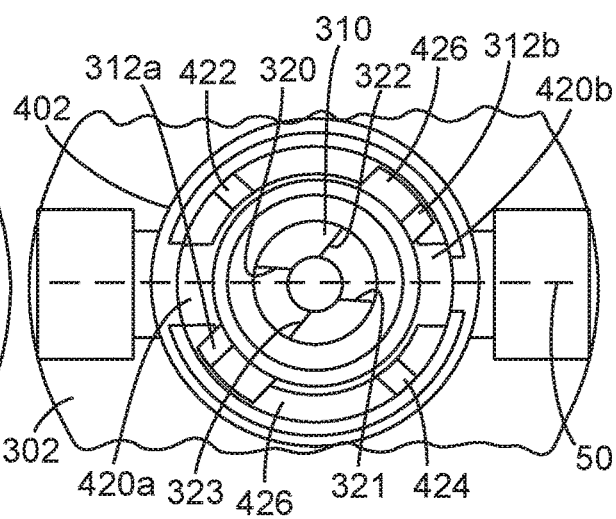
FIG. 24 is the top view according to FIG. 18 after a third stage rotation in a closing direction.

"Step 4" is a third stage rotation in a valve closing direction, which for this example is clockwise. The filter cartridge of FIGS. 23-24 has been rotated 45 degrees clockwise relative to Step 3. FIGS. 23 and 24 show the same view and position of the filter cartridge, where FIG. 23 provides the positioning of the valve engagement member relative to the valve body (housing is not shown) and FIG. 24 provides positioning of the retaining members relative to the housing of the valve (valve body is not shown). Water is still being supplied to the filter cartridge in this step. In Step 4, the first valve driving surfaces 320 and 321 are no longer engaged with the projection 414. The second valve driving surfaces (not numbered in FIG. 23 but identified in FIG. 24 as 322 and 323) come into contact with the projection 414. In FIG. 24, cartridge body 302 is shown. Retaining members 312a, 312b are now disposed above the cams (not numbered in FIG. 24 but identified in FIG. 22 as 410a, 410b).

Figure 25:
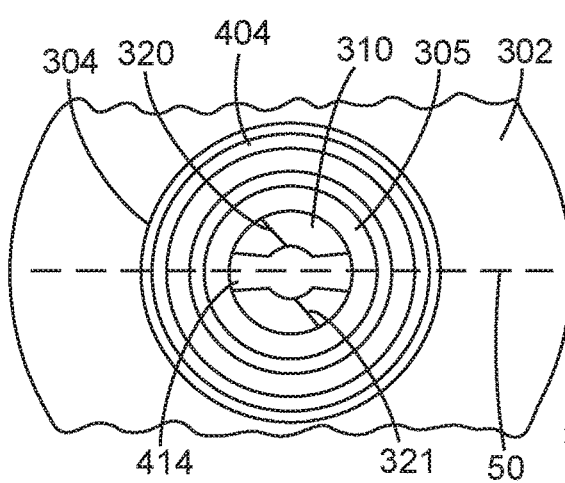
FIG. 25 is the top view according to FIG. 17 after a fourth stage rotation in the closing direction.

In "Step 5," which is a fourth stage rotation in the valve closing direction, after a further 50 degree rotation clockwise of the filter cartridge relative to Step 4, the valve body is moved into a closed position and water is no longer supplied to the manifold/filter cartridge. FIGS. 25 and 26 show the same view and position of the filter cartridge, where FIG. 25 provides the positioning of the valve engagement member 414 relative to the valve body 404 (housing is not shown) and FIG. 26 provides positioning of the retaining members 312a, 312b relative to the housing of the valve 402 (valve body is not shown). In Step 5, the second valve driving surfaces (not numbered in FIG. 25 but identified in FIG. 26 as 322 and 323) remain engaged with the projection 414, which results in rotating the valve body 404 to a closed position. At this point, water does not flow into the filter cartridge, the retaining members are no longer engaged with the cams, and the filter cartridge can be removed from the manifold. The first valve driving surfaces 320 and 321 are still not in contact with the projection 414. In FIG. 26, retaining members 312a, 312b have disengaged from the cams and reside in the insertion gaps. The filter cartridge is removable from the manifold in Step 5 by pulling the filter cartridge in a longitudinal direction to remove the stem from the valve body.

FIGS. 27-34 provide further exemplary valve engagement members and exemplary stem faces. In these embodiments, there are both opposing and complementary valve driving surfaces. Generally, the first timing radial arc of interest is arc between (I) the point(s) of the first valve driving surface(s) that will contact a portion of the valve when the filter cartridge moves in a valve opening direction and (II) the point(s) of the second valve driving surface(s) that will contact a portion of the valve when the filter cartridge moves in a valve closing direction. In each of FIGS. 27-34, "A", "B", "D", "E" are taken from lines that are tangent to the point(s) of the surface that will be in point contact with a portion of the valve. In each of FIGS. 27-34, "A" and "B" are tangency lines of opposing valve driving surfaces, "D" and "E" are tangency lines of opposing valve driving surfaces, "A" and "E" are tangency lines of complementary valve driving surfaces, and "B" and "D" are tangency lines of complementary valve driving surfaces.

Figure 27:
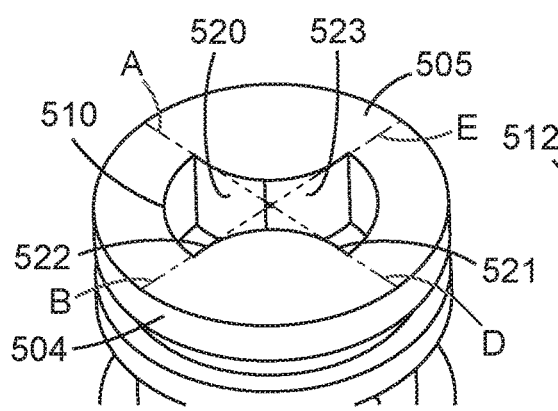
FIGS. 27 and 28 provide a perspective view and a top view, respectively, of an exemplary valve engagement member in a stem face.
Figure 28:
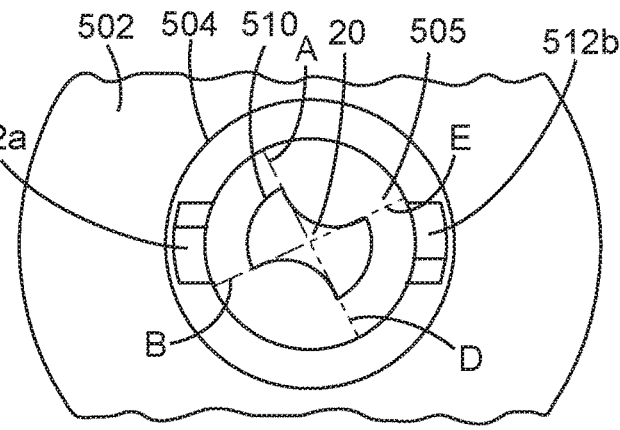

FIGS. 27 and 28 provide a perspective view and a top view, respectively, of an exemplary valve engagement member 510 in a stem face 505 of stem 504. Center point 20, cartridge body 502, and retaining members 512a, 512b are provided for perspective. The valve engagement member 510 is symmetrical having first valve driving surfaces 520 and 521, which are arcuate, and second valve driving surfaces 522 and 523, which are also arcuate. Surfaces 520 and 523 are adjacent to each other and their arcuate faces that meet smoothly. Like surfaces 520 and 523, surfaces 521 and 522 are also adjacent to each other and have arcuate faces that meet smoothly.

Figure 29:
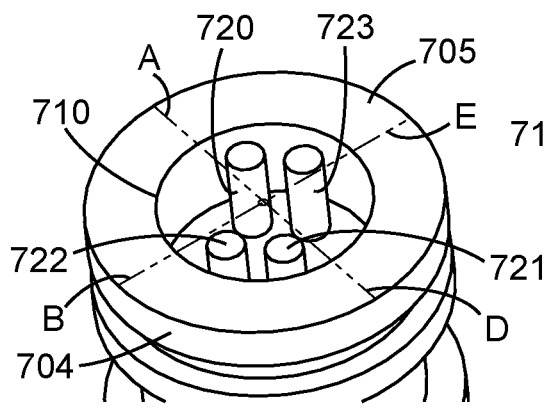
FIGS. 29 and 30 provide a perspective view and a top view, respectively, of an exemplary valve engagement member in a stem face.
Figure 30:
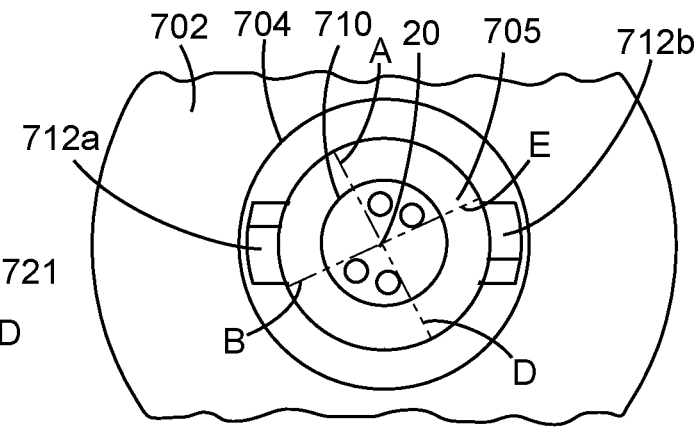

FIGS. 29 and 30 provide a perspective view and a top view, respectively, of an exemplary valve engagement member 710 in a stem face 705 of stem 704. Center point 20, cartridge body 702, and retaining members 712a, 712b are provided for perspective. The valve engagement member 710 is symmetrical having first valve driving surfaces 720 and 721, which are arcuate, and second valve driving surfaces 722 and 723, which are arcuate. Surfaces 720 and 723 are adjacent to each other and are posts. Like surfaces 720 and 723, surfaces 721 and 722 are also adjacent to each other and are posts.

Figure 31:
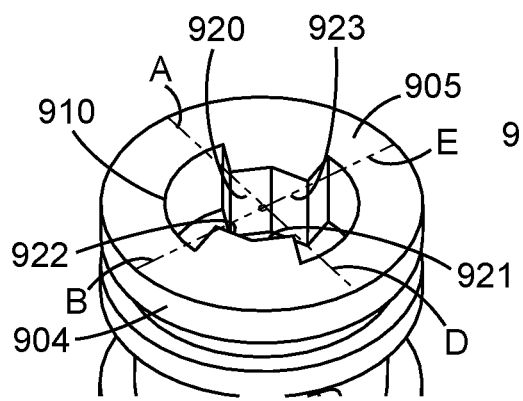
FIGS. 31 and 32 provide a perspective view and a top view, respectively, of an exemplary valve engagement member in a stem face.
Figure 32:
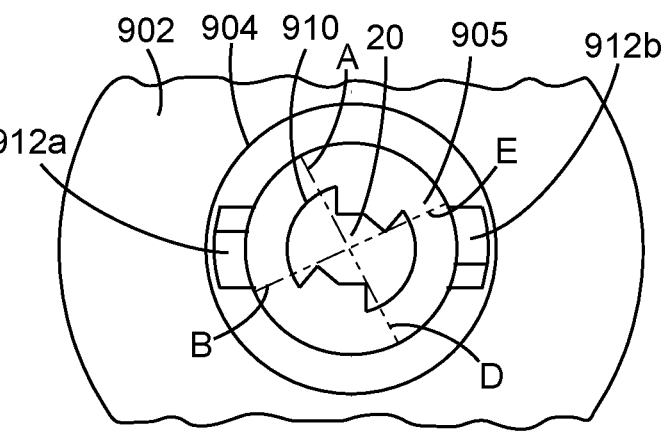

FIGS. 31 and 32 provide a perspective view and a top view, respectively, of an exemplary valve engagement member 910 in a stem face 905 of stem 904. Center point 20, cartridge body 902, and retaining members 912a, 912b are provided for perspective. The valve engagement member 910 is symmetrical having first valve driving surfaces 920 and 921, which are "vee"-shaped, and second valve driving surfaces 922 and 923, which are "vee"-shaped. Surfaces 920 and 923 are adjacent to each other and have two flat faces that meet at a line thereby forming a "vee". Like surfaces 920 and 923, surfaces 921 and 922 are also adjacent to each other and have two flat faces that meet at a line thereby forming a "vee".

Figure 33:
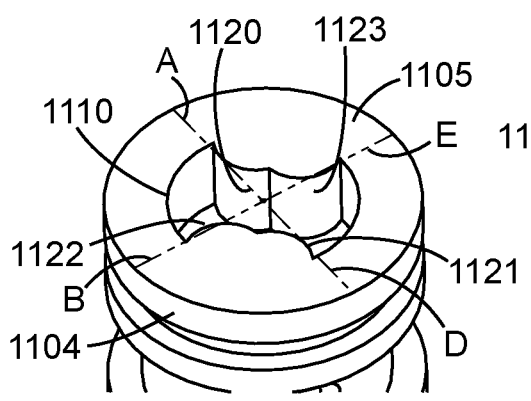
FIGS. 33 and 34 provide a perspective view and a top view, respectively, of an exemplary valve engagement member in a stem face.
Figure 34:
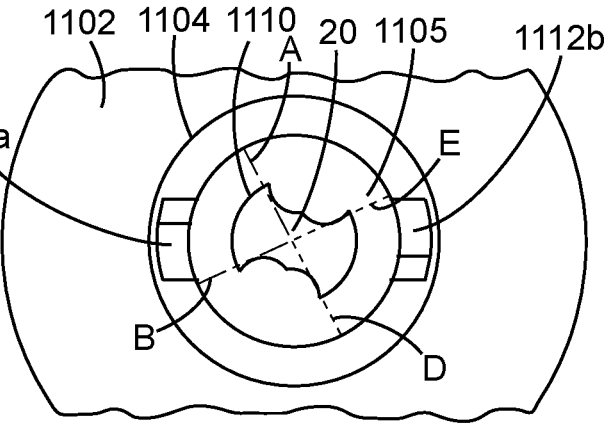

FIGS. 33 and 34 provide a perspective view and a top view, respectively, of an exemplary valve engagement member 1110 in a stem face 1105 of stem 1104. Center point 20, cartridge body 1102, and retaining members 1112a, 1112b are provided for perspective. The valve engagement member 1110 is symmetrical having first valve driving surfaces 1120 and 1121, which are arcuate, and second valve driving surfaces 1122 and 1123, which are arcuate. Surfaces 1120 and 1123 are adjacent to each other and have arcuate faces that meet at an angle thereby forming a crevice. Like surfaces 1120 and 1123, surfaces 1121 and 1122 are also adjacent to each other and have arcuate faces that meet at an angle thereby forming a crevice.

Figure 35:
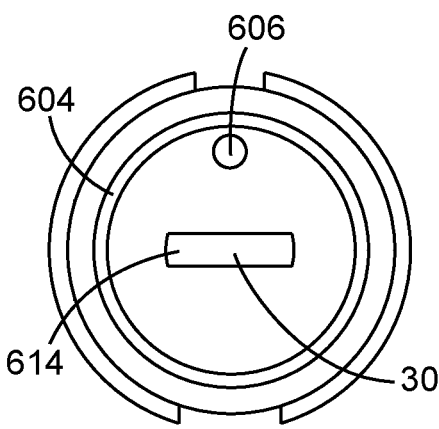
FIGS. 35-40 provide plan views of exemplary projections of the valve body that are engagable with valve engagement members.

With respect to projections of the valve body, sizes and shapes may be chosen as desired. In the following, a variety of non-limiting configurations are provided. Often the projections may be a single piece or may be formed by a plurality of pieces, which on the whole are dimensioned to fit into a valve engagement member and to provide surfaces for the valve engagement member to contact. FIGS. 35-40 provide plan views looking into the valve body in the absence of a filter cartridge of exemplary projections of the valve body that are engagable with valve engagement members. In FIG. 35, which is similar to the projection 214 of FIG. 4, the projection 614 of valve body 604 has a length defined by two flat sides connected by slightly arcuate surfaces at each end and a width defined by a flat face that would allow it to be inserted into a valve engagement member and operate with at least a first drive surface and a second drive surface. Vent 606 and center point 30 are provided for perspective.

Figure 36:
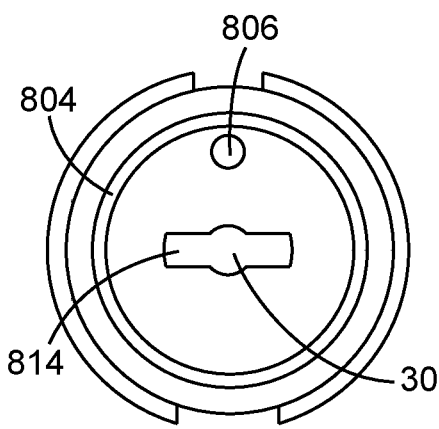

The projection 814 of valve body 804 of FIG. 36 has a length and a varying width that would allow it to be inserted into a valve engagement member and operate with at least a first drive surface and a second drive surface. The projection in this embodiment has a center bump with two generally opposing rectangular shapes extending therefrom. Faces of the projection 614 are therefore both flat and curved. Vent 806 and center point 30 are provided for perspective.

Figure 37:
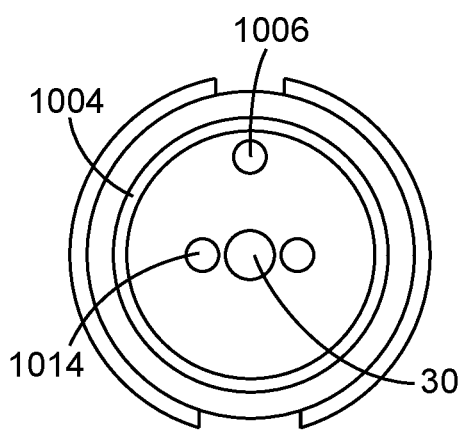

FIG. 37 provides the projection 1014 of valve body 1004, which has three pieces, a post of a first diameter having two posts of smaller diameter on each side, the combination of which may be inserted into a valve engagement member and operates with at least a first drive surface and a second drive surface. The posts are cylindrical, but can be of any desired cross-sectional shape, and spaced apart. Vent 1006 and center point 30 are provided for perspective.

Figure 38:
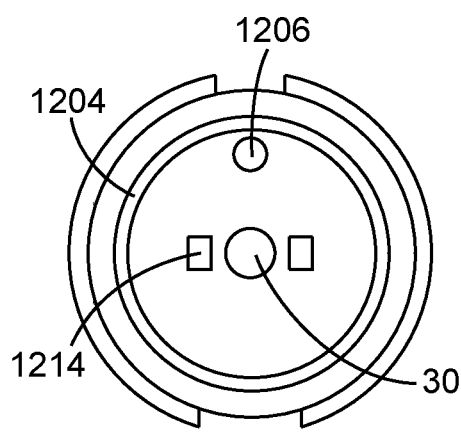

FIG. 38 provides the projection 1214 of valve body 1204, which has three pieces, a cylindrical post of a first diameter having two rectangular posts of smaller diameter on each side, the combination of which may be inserted into a valve engagement member and operates with at least a first drive surface and a second drive surface. The posts are spaced apart. Vent 1206 and center point 30 are provided for perspective.

Figure 39:
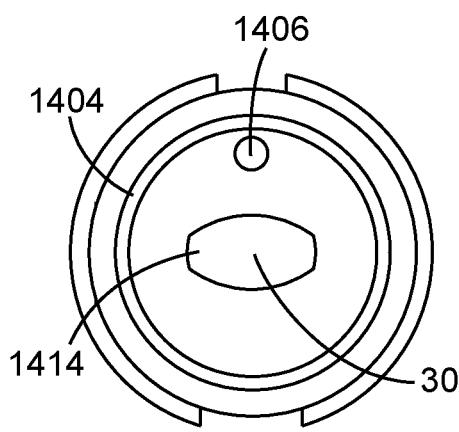

In FIG. 39, the projection 1414 of valve body 1404 has a length and varying width that would allow it to be inserted into a valve engagement member and operate with at least a first drive surface and a second drive surface. The sides of the projection 1414 are two opposed concave surfaces connected by slightly arcuate surfaces at each end and connected by a flat face having a varying width. Vent 1406 and center point 30 are provided for perspective.

Figure 40:
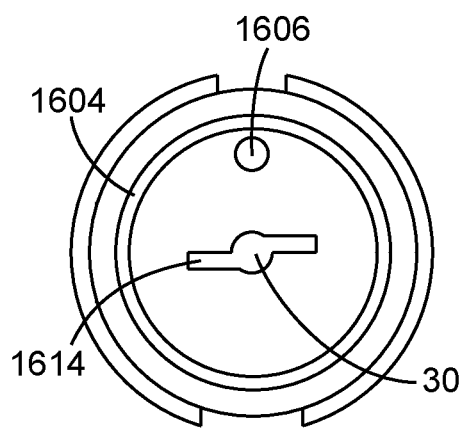

The projection 1614 of valve body 1604 of FIG. 40 has a center bump with two off-set rectangular shapes, one being in a upper position and the other being in a lower position, extending therefrom that would allow it to be inserted into a valve engagement member and operate with at least a first drive surface and a second drive surface. The faces of the projection 1614 are therefore both flat and curved. Vent 1606 and center point 30 are provided for perspective.

With respect to retaining members, sizes and shapes may be chosen as desired. In the following, a variety of non-limiting configurations are provided. Often the retaining members are provided in identical pairs, but the embodiments herein may have only one retaining member or more than two. Furthermore, if more than one retaining member is present, the retaining members can be identical or have different structures. Manifolds, specifically housings of valves, may have cams of differing designs and may be able to receive different types of retaining members.

Figure 41:
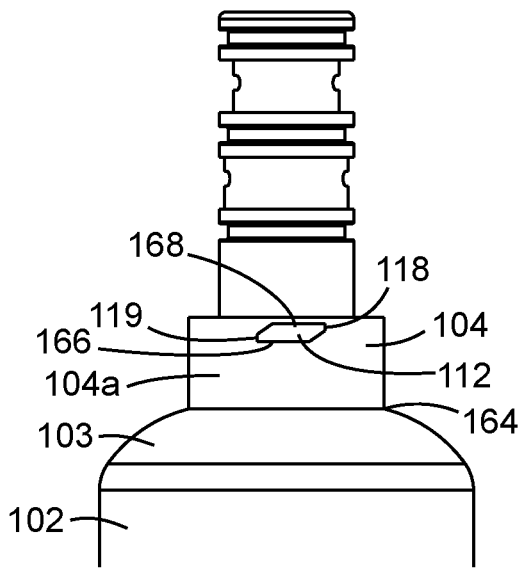
FIGS. 41-44 provide exemplary retaining members located on a cartridge body or stem.

In FIG. 41, protruding from the stem 104 is retaining member 112 in the shape of a lug having a leading engagement edge 118 and a trailing edge 119. As shown in FIG. 41, the lug may protrude outwardly from the stem neck 104a in a radial direction that is perpendicular to a longitudinal axis of the stem. The leading edge 118 may have a ramped surface that is at an angle of greater than zero degrees (e.g., about 10-55° or about 25-50° or about 45°) relative to the intersection 164 of the stem 104 and the shoulder 103. Likewise, the trailing edge 119 may have a ramped surface that is at an angle of greater than zero degrees (e.g., about 10-55° or about 25-50° or about 45°) relative to the intersection 164 of the stem 104 and the shoulder 103. The leading edge 118 and the trailing edge 119 may have substantially parallel ramped surfaces. Spanning between the leading edge 118 and the trailing edge 119 is the body of the lug which has an upper camming surface 168 and a lower camming surface 166 that are substantially parallel (or at an angle of zero) to each other and to the intersection 164 of the stem 104 and the shoulder 103. In some embodiments, upon insertion and appropriate rotation of the filter cartridge in the manifold, the leading engagement edge 118 followed by the lower camming surface 166 can ride on a manifold cam to facilitate engagement of the retaining member 112 with the manifold. Once fully engaged, the lower camming surface 166 can apply a force to retain the filter cartridge within the manifold. In some embodiments, the trailing edge 119 optionally in conjunction with the upper camming surface 168 interacts with an appropriate structure in the manifold upon rotation in the opposite direction to facilitate disengagement of the retaining member 112 from the manifold.

Figure 42:
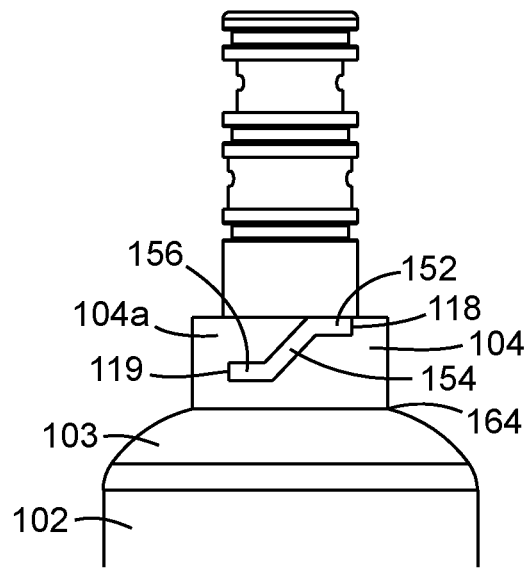

In FIG. 42, the retaining member is a combination of horizontal portions and at least one angled portion that protrude from stem 104. Specifically, the retaining member is on the stem neck 104a of FIG. 42, comprising a first horizontal portion 152, an angled portion 154, and a second horizontal portion 156. The first horizontal portion 152 comprises leading engagement edge 118 and may have a ramped surface on its undersurface that is at an angle of greater than zero degrees (e.g., about 10-55° or about 25-50° or about 45°) relative to the intersection 164 of the stem 104 and the shoulder 103 to facilitate engagement with a manifold cam. A top surface of the first horizontal portion is substantially parallel (or at an angle of zero) to the intersection 164 of the stem 104 and the shoulder 103. The second horizontal portion 156 has a trailing edge 119 and may have a ramped surface on its undersurface that is at an angle of greater than zero degrees (e.g., about 10-55° or about 25-50° or about 45°) relative to the intersection 164 of the stem 104 and the shoulder 103. The angled portion 154 comprises an undersurface and a topside surface that are substantially parallel to each other and that spiral or wind upwardly along the surface of the stem 104, specifically the stem neck 104a. Once fully engaged, all or a portion of the undersurfaces of the retaining member can apply a force to retain the filter cartridge within the manifold.

Figure 43:
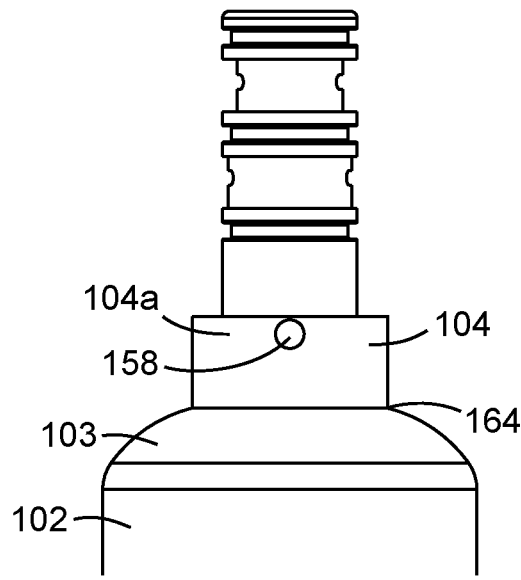

In FIG. 43, the retaining member is a pin 158 protruding outwardly from the stem 104 in a radial direction that is perpendicular to a longitudinal axis of the stem 104. The pin in the embodiment of FIG. 43 is located on the stem neck 104a. The pin 158 may have a circular cross-section as shown in FIG. 43, or may be rectangular, triangular, irregular, or any other desired shape. An undersurface of the pin 158 may have one or more ramped surfaces that are at an angle of greater than zero degrees (e.g., about 10-55° or about 25-50° or about 45°) relative to the intersection 164 of the stem 104 and the shoulder 103 to facilitate engaging and disengaging a manifold cam. Once fully engaged, the undersurface of the pin 158 can apply a force to retain the filter cartridge within the manifold.

Figure 44:
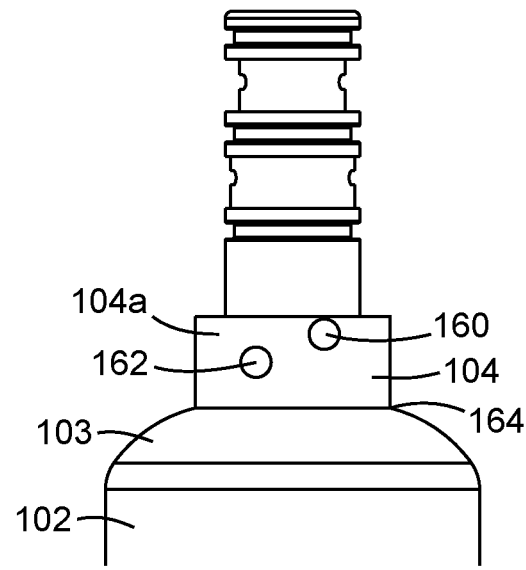

In FIG. 44, the retaining member is a combination of a first pin 160 and a second pin 162, each pin protruding outwardly from the stem 104 in a radial direction that is perpendicular to a longitudinal axis of the stem 104. The pins in the embodiment of FIG. 44 are located on the stem neck 104a. As shown in FIG. 44, the pins may be offset in that the distance from pin 160 to the intersection 164 of the stem 104 and the shoulder 103 may be different than the distance from pin 162 to the intersection 164 of the stem 104 and the shoulder 103. Undersurfaces of the pin 158 may have one or more ramped surfaces that are at an angle of greater than zero degrees (e.g., about 10-55° or about 25-50° or about) 45° relative to the intersection 164 of the stem 104 and the shoulder 103 to facilitate engaging and disengaging a manifold cam. The pins 160 and 162 may have a circular cross-section as shown in FIG. 44, or may be rectangular, triangular, irregular, or any other desired shape. The pins may have the same cross-sectional shape or may have different shapes, and the pins may be similarly sized or one pin may be larger than another pin. Furthermore, more than two pins may be present, such as a combination of three, four, etc. pins. The undersurface of some or all of the pins can apply a force to retain the filter cartridge within the manifold once the filter cartridge is fully engaged.

Figure 45:
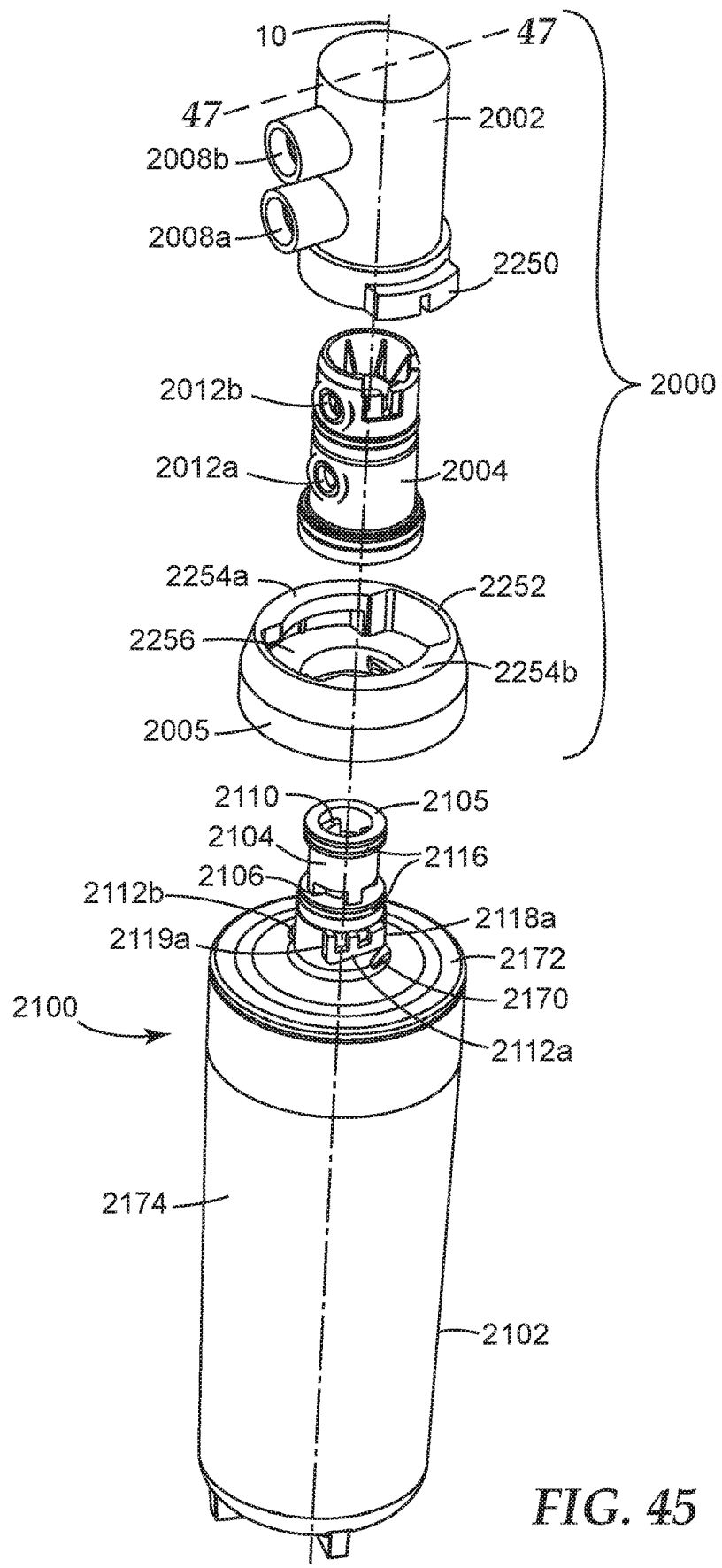
FIG. 45 is an exploded perspective view of a manifold and filter cartridge in accordance with an embodiment.

FIG. 45 provides an exploded perspective view of a manifold 2000 and filter cartridge 2100 in accordance with an embodiment. Manifold 2000 comprises a housing (or outer valve) 2002 for a valve body (or inner valve) 2004 and a support flange 2005, which may optionally have a mounting bracket. Manifold 2000 is designed to be part of a fluid filtration system to which water would be supplied. The housing 2002 comprises one or more struts 2250 that are engageable upon rotation with retention ribs 2254a and 2254b of the support flange 2005. The struts 2250 project radially outwardly from the lower region of housing 2002. Upon assembly of the valve body 2004, the housing 2002, and the support flange 2005, flow channels 2012a, 2012b, which are openings from an outer surface to an inner surface of the valve body 2004, are in fluid communication with the inlet and outlet ports 2208a, 2208b, which are flow passages from an outer surface to an inner surface of the housing 2002, when the valve body 2004 is in an open position. Flow channels 2012a, 2012b are not in fluid communication with the inlet and outlet ports 2008a, 2008b when the valve body 2004 is in a closed position and the inlet and outlet ports 2008a, 2008b are blocked by the surface of the valve body. Filter cartridge 2100 comprises a cartridge body 2102, which is often generally cylindrical in shape, and a stem 2104 extending from the cartridge body 2102. The cartridge body 2102 has a cover 2172 disposed substantially laterally between a generally cylindrical sump 2174 that contains filter media and the stem 2104. The diameter of the stem 2104 is less than the diameter of the sump 2174. Longitudinal axis 10 is shown lengthwise down the centers of the manifold 2000 and the filter cartridge 2100. The stem 2104 has an inlet opening 2106, and a stem face 2105, where an outlet opening is through the stem face 2105. As will be discussed with respect to FIG. 46, the stem face 2105 comprises a valve engagement member 2110 is located below the stem face 2105.

In the embodiment of FIGS. 45-59, the inlet opening 2106 is designed for entry of a fluid in a radial direction perpendicular to the longitudinal axis of the stem and the outlet opening 2108 is designed for exit of the fluid in an axial direction parallel or concentric with the longitudinal axis of the stem.

Retaining members 2112a, 2112b are attached to the stem 2104. Stem 2104 may comprise segments of different diameters and surface features, for example stem neck 2104a is proximate to the cover 2172; upper portion 2104d, whose surface contains inlet opening 2106, is disposed between two O-rings 2116; and stem tip 2104e containing the outlet opening 2108 is above the uppermost O-ring, distal to the cover 2172.

The retaining members 2112a, 2112b of the embodiment of FIG. 45 respectively each have a leading engagement edge and a trailing edge. As shown in FIG. 45, retaining member 2112a has a leading engagement edge 2118a and a trailing edge 2119a. O-rings 2116 are located on the stem 2104: at a first location between the inlet opening 2106 and the outlet opening 2108 and at a second location below the inlet opening 2106. On the stem 2104 is one or more frictional ramps 2170 which assist in keeping the filter cartridge 2100 in place during use. The use of frictional ramps 2170 is optional. Frictional ramps laterally protrude from the stem neck 2104a proximate the cover 2172. As least an undersurface and optionally an upper surface of the ramp is at an angle greater than zero from the intersection of the stem 2104 and the cover 2172. The underside surface and the upper surface may be at the same or different angles. Upon rotation of the filter cartridge into the manifold, the one or more frictional ramps 2170 ride along an underside of the support flange 2005.

Figure 46:
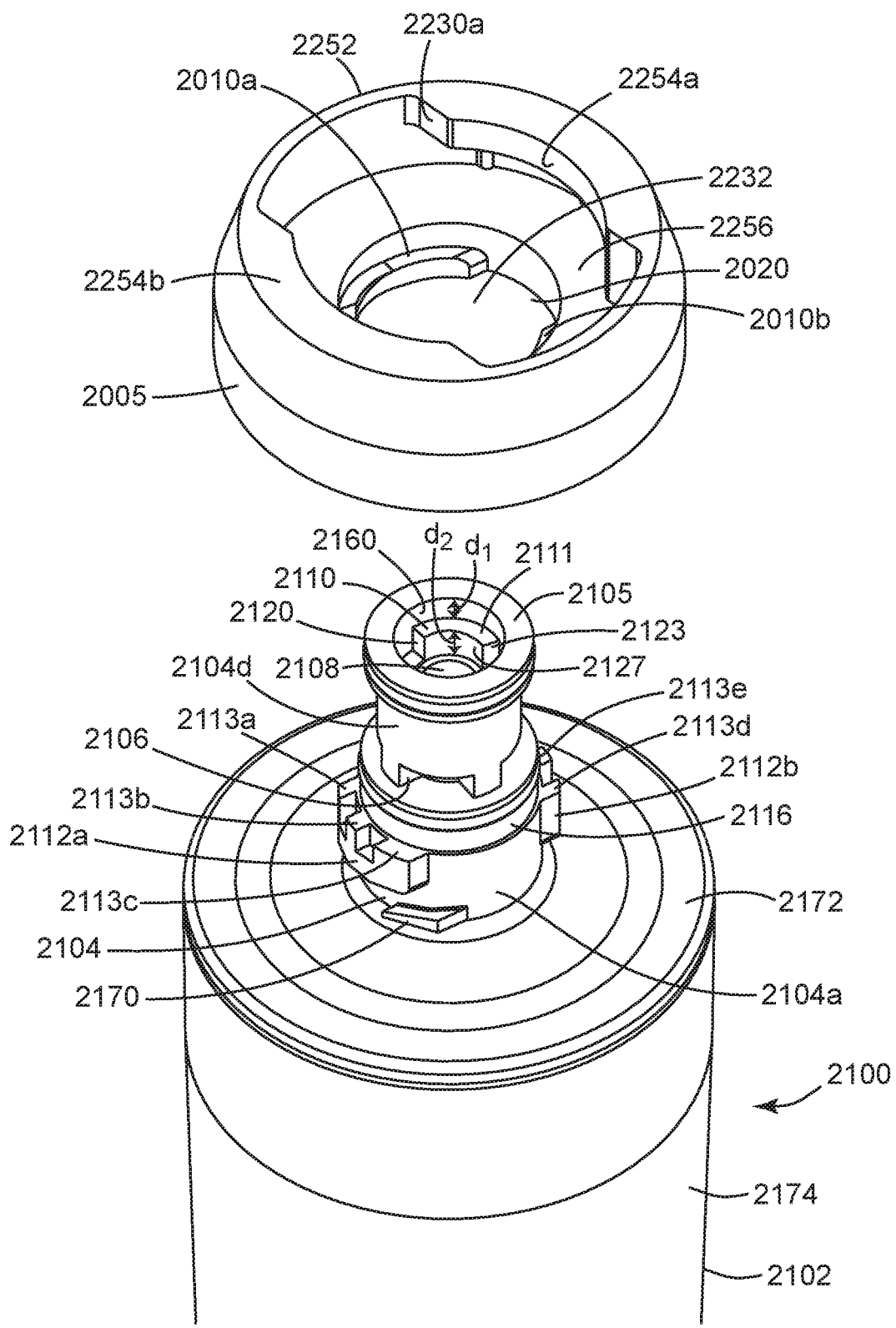
FIG. 46 an exploded perspective view of a support flange and mounting bracket with a stem of a filter cartridge.

FIG. 46 provides an exploded perspective view of the support flange 2005 relative to the stem 2104 of the filter cartridge 2100, whose body comprises a cover 2172 and a sump 2174. Radial inlet opening 2106 receives unfiltered process fluid, directing the fluid into the filter cartridge 2100. Upper portion 2104d further defines axial outlet opening 2108 for delivering filtered process fluid from the filter cartridge 2100 for egress through the flow channels 2012a, 2012b of valve body 2004 and the outlet port 2008a of housing 2002 (in FIG. 45). Those skilled in the art will readily appreciate that the inlet and outlet openings in the stem 2104 could be reversed such that the inlet flow is axial and the outlet flow is radial. The inlet and outlet openings 2106 and 2108 are sealingly isolated from one another by O-ring seal 2116 positioned at the upper portion 2104d of stem 2104. A second O-ring seal 2116 is positioned below the radial inlet passage 2106 to sealingly engage the stem 2104 within an interior chamber of the valve body 2004 and prevent the leakage of unfiltered process fluids from the manifold while in operation.

Support flange 2005 includes a recessed seating area 2256 defined by annular retaining wall 2252 and configured to receive and retain the strut 2250 of valve housing 2002. Retention ribs 2254a and 2254b project inwardly from retaining wall 2252 to engage by friction with corresponding ramped engagement struts of the valve housing when the housing 2002 is rotatably engaged within the recessed seating area 2256 during assembly. Stop surfaces 2230a and 2230b are associated with retention ribs 2254a and 2254b, respectively, for limiting the movement of the valve housing within seating area 2256.

The pair of retaining members 2112a and 2112b project radially outwardly from stem neck 2104a of stem 2104. The pair may be diametrically opposed. Retaining members 2112a and 2112b are dimensioned and configured to facilitate rotational engagement of the filter cartridge with support flange 2005. The support flange 2005 and an optional mounting bracket may be individually injection molded and then later affixed or engaged; or alternatively, they may be a single injection molded piece. Central aperture 2232 extends through support flange 2005 for receiving the stem 2104 of filter cartridge 2100. Manifold cams 2010a and 2010b project radially into central aperture 2232 for interacting with inclined lower surfaces of retaining members 2112a and 2112b. The manifold cams 2010a and 2010b are spaced from one another to form an insertion gap 2020 to allow the retaining members 2112a and 2112b to fit therebetween when the stem passes through aperture 2232 during assembly, and they are inclined along their arc length to facilitate rotational engagement of the filter cartridge with support flange 2005.

Valve engagement member 2110 is located below the stem face 2105. In the embodiment of FIG. 46, stem 2104 comprises a bore 2160 having a generally cylindrical shape a first depth, "$d_1$" below the surface of the stem face 2105. The valve engagement member 2110 having a depth "$d_2$" below the bore 2160 comprises first valve driving surface 2120 and second valve driving surface 2123. Outlet opening 2108 is below the stem face 2105. Inlet opening 2106 is an upper potion 2104d of the stem 2104. A first top face 2111 of the valve engagement member is perpendicular to the first valve driving surface 2120, the second valve driving surface 2123, and arcuate surface 2127. A corresponding set of features to the first top face 2111, the first valve driving surface 2120, the second valve driving surface 2123, and the arcuate surface 2127 are included as part of the valve engagement member but are not shown in this perspective. The first valve driving surfaces 2120 (and 2121 not shown) are used to move a portion of the valve body in a first direction and the second valve driving surfaces 2123 and/or 2122 (not shown) are used to move a portion of the valve body in a second direction. In this embodiment, the first valve driving surfaces 2120, 2121 and second valve driving surfaces 2122, 2123 are flat and have mirror symmetry to the longitudinal axis 10. In the embodiment of FIG. 46, the valve engagement member 2110 is configured to accommodate the outlet opening 2108.

Stem neck 2104a comprises the retaining members 2112a, 2112b, each of which possesses a key formation in accordance with co-assigned U.S. Pat. No. 7,763,170 (Bassett), which is incorporated herein by reference. On retaining member 2112a, there are a plurality of axial teeth 2113a, 2113b, 2113c and on retaining member 2112b there are a plurality of 2113d, 2113e and a third not shown. The teeth extend longitudinally from and are spaced apart axially along an upper surface of retaining members 2112a and 2112b. The teeth protrude radially from stem neck 2104a. In one or more embodiments, within valve body 2004 there is a corresponding set of spaced apart recesses to receive the teeth. Stem neck 2104a also comprises optional frictional ramp 2170 to assist in keeping the filter cartridge 2100 in place during use.

Figure 47:
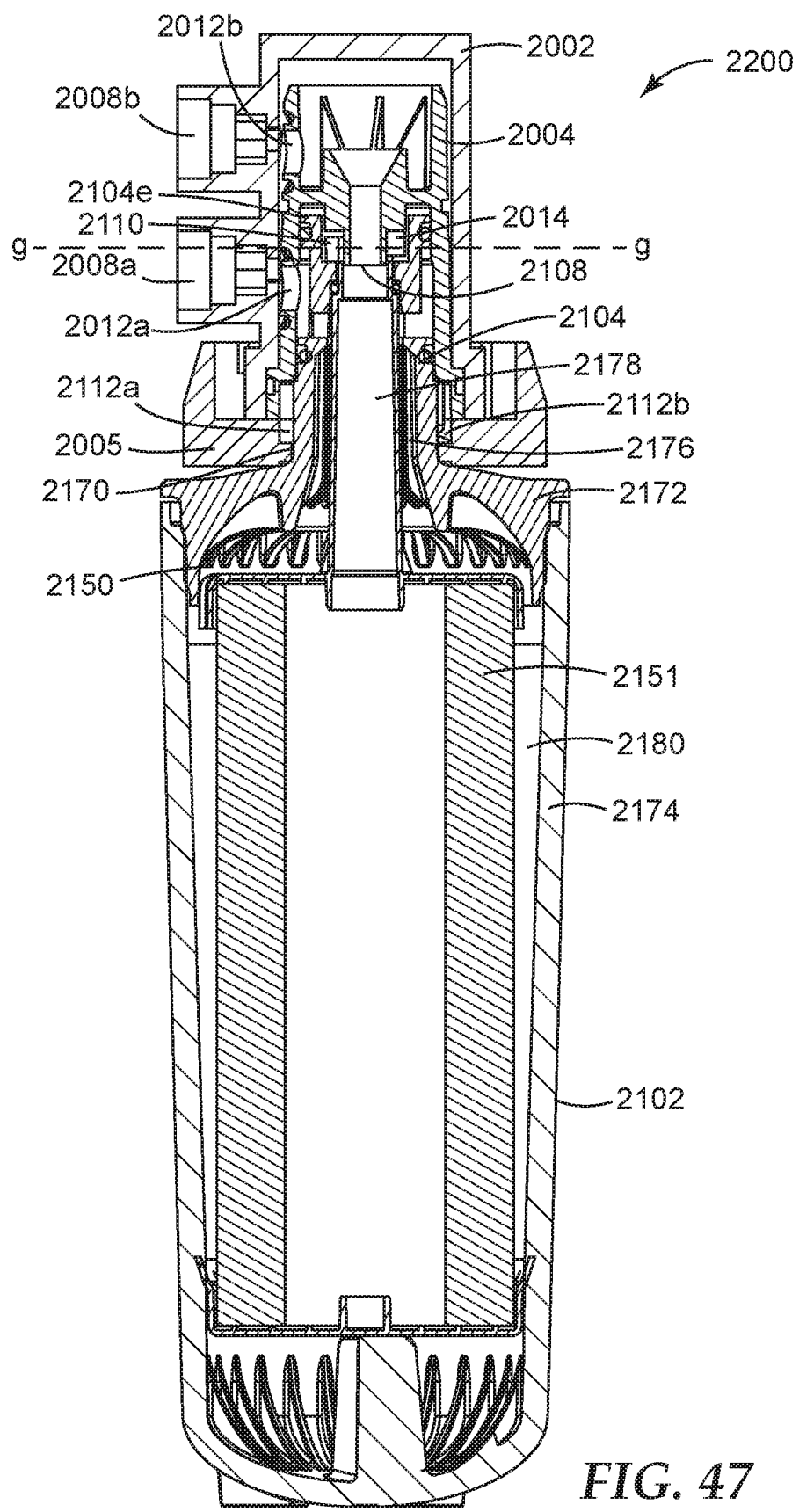
FIG. 47 is a cross-section view of the embodiment of FIG. 45 along line 47-47.
Figure 48:
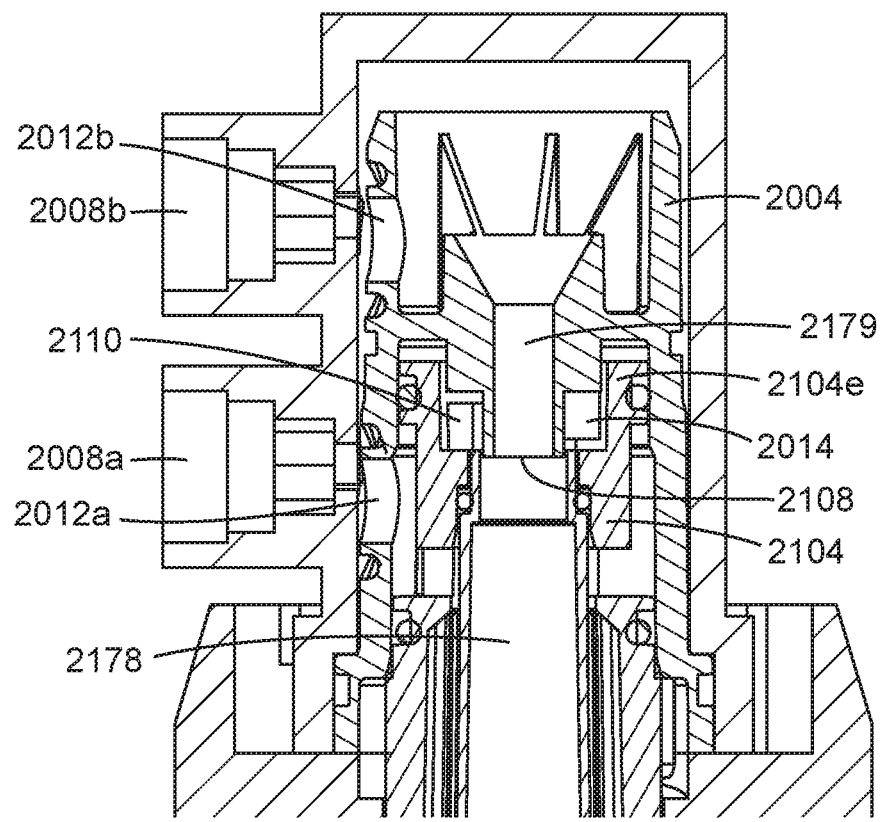
FIG. 48 is a close-up view of a portion of the cross-section of FIG. 47.

FIG. 47 shows system 2200 in a cross-section view along line 47-47 of FIG. 45. FIG. 48 shows a close-up view of a portion of the cross-section view of FIG. 47. The filter cartridge 2102 comprises a cylindrical cartridge body made up of a cover 2172 and a sump 2174. An inflow channel 2176 receives unfiltered water when valve body 2004 is in an open position by way of inlet port 2008a of the housing 2002 and flow channel 2012a. The unfiltered water flows into media chamber 2180 and the water contacts filter media 2151 for treatment/purification. An exemplary filter media is a carbon block with polymeric binder particles. End cap 2150 is affixed to filter media 2151. Water flows through the filter media 2151 and through a first outflow channel 2178 of end cap 2150 back through the outlet opening 2108 out of stem tip 2104e and through and a second outflow channel 2179 of valve body 2004 and flow channel 2012b to outlet port 2008b. The support flange 2005 comprises retaining wall 2252 and recessed seating area 2256. The housing 2002 comprises the inlet and outlet ports, 2008a and 2008b, respectively. Valve body 2004 comprises projection 2014 that engages with valve engagement member 2110. Retaining members 2112a, 2112b and frictional ramp 2170 on stem 2104 are engaged with support flange 2005.

Figure 49:
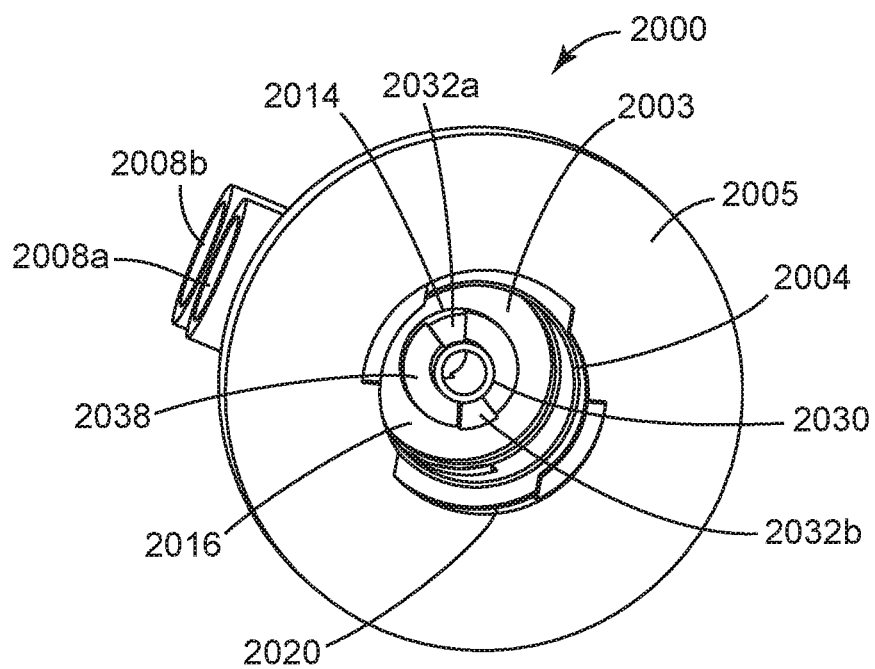
FIG. 49 is a perspective view into an exemplary manifold.

FIG. 49 provides a perspective view into an exemplary manifold 2000. Cartridge opening 2016 receives a stem of a cartridge filter. The valve body (or inner valve) 2004 is located in the housing and is held between the support flange and the housing during use. The housing has inlet and outlet ports 2008a, 2008b, respectively. The valve body 2004 has a bushing 2038 that mates with bore 2160 (of FIG. 46) and a portion 2014 that is engagable with, for example, the valve engagement member of FIG. 46. The bushing 2038 is generally cylindrical extending in an axial direction from the valve body 2004 and having a nominal depth of "$d_1$" from the inner surface 4003 of the valve body 4004. In the embodiment of FIG. 49, extending from the bushing 2038 is the portion 2014 in the form of a projection comprising features that mate with the valve engagement member of FIG. 46: wings 2032a, 2032b and annulus 2030 with an opening to accommodate flow out of the filter. Together, the wings 2032a, 2032b and annulus 2030 generally form a keystone shape. The annulus 2030 extends longitudinally relative to the central axis of the filter cartridge, having an elongate body (of nominal length "$d_2$"+"$d_3$") and an opening, which has a diameter that is smaller than the diameter of the bushing 2038. Extending from the body of the annulus 2030 are wings 2032a, 2032b having a nominal thickness (or depth from bushing 2038) of "$d_2$". The wings 2032a, 2032b are generally wedge-shaped, each having two flat sides that angle out from the body of the annulus 2030 that are connected by an arcuate surface. A face of each wing 2032a, 2032b is perpendicular to each flat side and arcuate surface. The support flange 2005 has and an insertion gap 2020. A retaining member of the filter cartridge is inserted into the insertion gap 2020. Upon rotation of the filter cartridge, the retaining member initially engages with a manifold cam until it is fully engaged.

In FIGS. 50-59, the progression of inserting and removing the stem end of FIG. 46 from the manifold according to FIG. 49 is provided. The view of the manifold is taken along line g-g of FIG. 47, which is located through inlet port 2008a and at the top edge of the outlet opening 2108 of the stem 2104.

Figure 50:
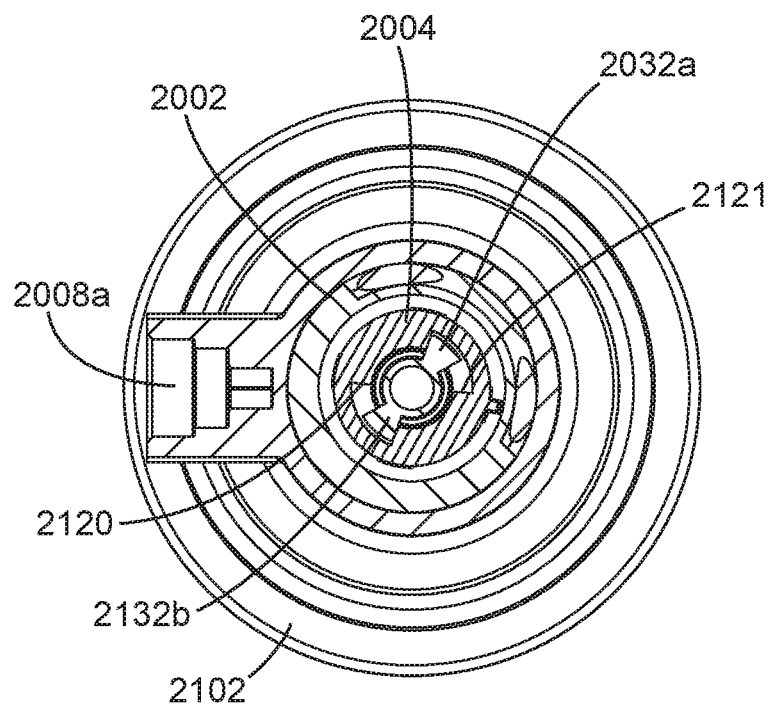
FIG. 50 is a top view of an exemplary manifold in combination with the stem end of FIG. 46 upon insertion of the stem end into a manifold according to FIG. 45.
Figure 51:
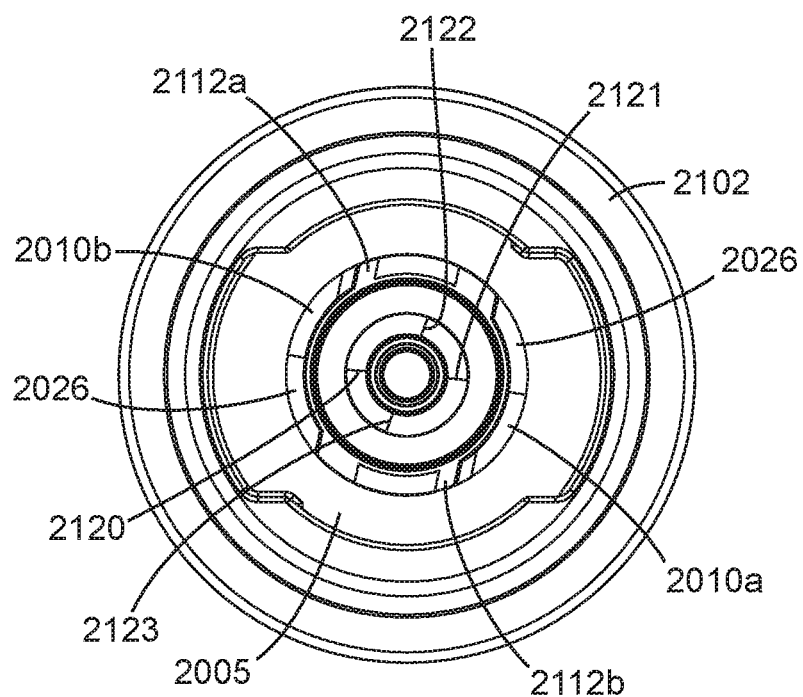
FIG. 51 is a top view of an exemplary support flange in combination with the stem end of FIG. 46 upon insertion of the stem end into a manifold according to FIG. 45.

Starting with "Step 1," FIGS. 50 and 51 show the same view and position of the filter cartridge, where FIG. 50 provides the positioning of the valve engagement member relative to the inlet port 2008a of the housing 2002 and the wings 2032a, 2032b of the projection of valve body 2004 and FIG. 51 provides positioning of the retaining members 2112a, 2112b relative to the support flange 2005 (valve body is not shown). In the position of FIG. 50, the first driving surfaces 2120, 2121 are generally not in contact with the wings 2032a, 2032b of the valve body 2004 upon insertion of the filter cartridge into the manifold. Because this is a top view, the support flange 2005 and the cartridge body 2102 are shown. In Step 1, the valve body 2004 is in a closed position and water is not supplied to the manifold/filter cartridge. Second valve driving surfaces (not numbered in FIG. 50 but identified in FIG. 51 as 2122 and 2123) are near, and optionally in contact with, the wings 2032. In FIG. 51, cartridge body 2102 is shown. Retaining members 2112a, 2112b are positioned in insertion gaps (not numbered in FIG. 51 but identified in FIG. 53 as 2020a, 2020b) of the support flange 2005. At this point, the retaining members 2112a, 2112b have not yet engaged with manifold cams 2010a, 2010b. Support flange 2005 comprises threads 2026 adjacent to the cams 2010a, 2010b. Optionally, stops are located adjacent to the threads at an end opposite to that of the cams.

Figure 52:
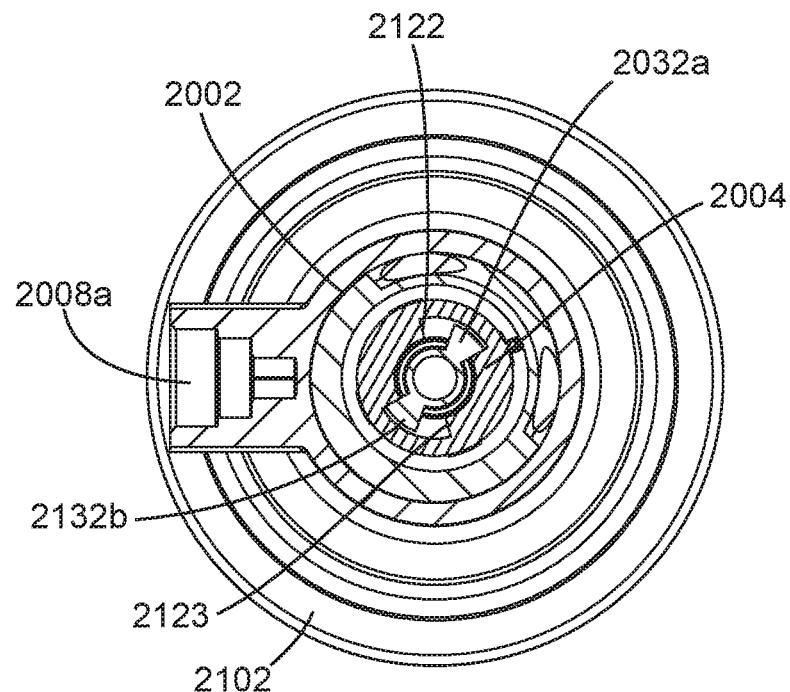
FIG. 52 is the top view according to FIG. 50 after a first stage rotation in an opening direction.
Figure 53:
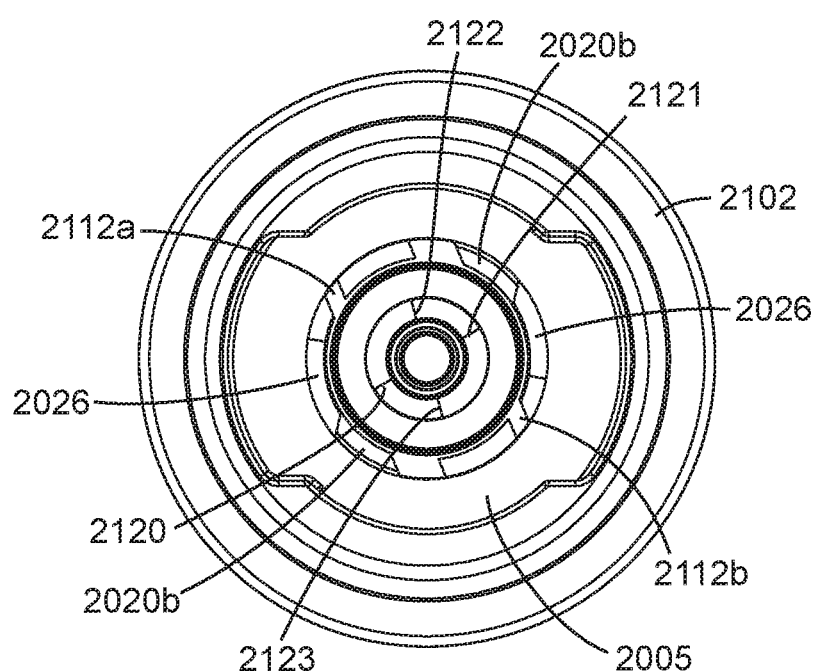
FIG. 53 is the top view according to FIG. 51 after a first stage rotation in an opening direction.

"Step 2" is a first stage rotation in a valve opening direction, which for this example is counter-clockwise. The filter cartridge of FIGS. 50-51 has been rotated 35 degrees counter-clockwise relative to Step 1. FIGS. 52 and 53 show the same view and position of the filter cartridge, where FIG. 52 provides the positioning of the valve engagement member relative to the inlet port 2008a of the housing 2002 and the wings 2032a, 2032b of the projection of valve body 2004 and FIG. 53 provides positioning of the retaining members 2112a, 2112b relative to the support flange 2005 (valve body is not shown). In Step 2, the valve body 2004 remains in a closed position and water is still not supplied to the manifold/filter cartridge. Because this is a top view, the support flange 2005 and the cartridge body 2102 are shown. The position of the wings 2032a, 2032b is the same in Step 2 as it was in Step 1, and the valve engagement member has rotated 35° without engaging the wings 2032a, 2032b. First valve driving surfaces (not numbered in FIG. 52 but identified in FIG. 53 as 2120 and 2121) are near, and generally come into contact with, the wings 2032. Second valve driving surfaces 2122 and 2123 are not in contact with the wings 2032. In FIG. 53, cartridge body 2102 is shown. Retaining members 2112a, 2112b engage with cams (not numbered in FIG. 53 but identified in FIG. 51 as 2010a, 2010b) and optionally to some extent with the threads 2026 thereby locking the filter cartridge into the manifold.

Figure 54:
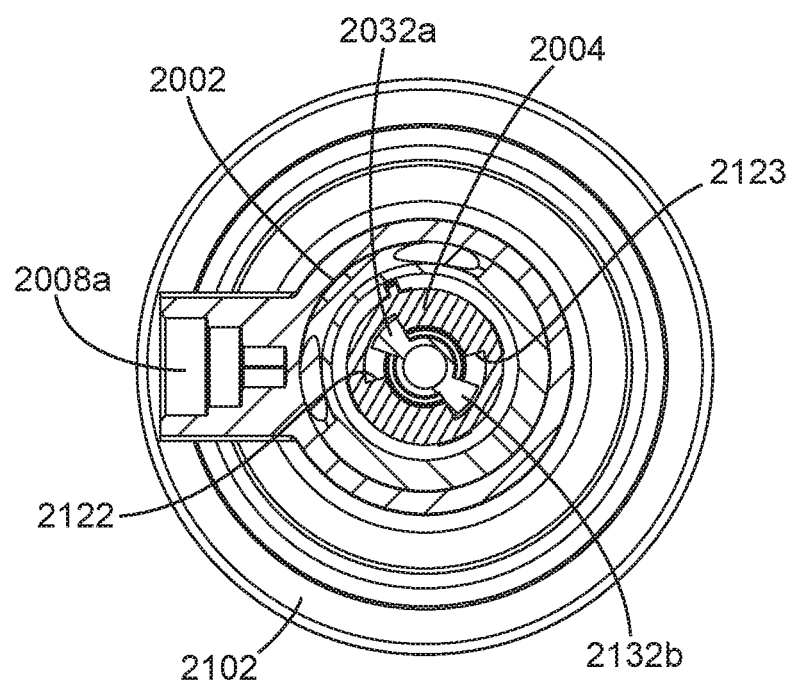
FIG. 54 is the top view according to FIG. 50 after a second stage rotation in the opening direction.
Figure 55:
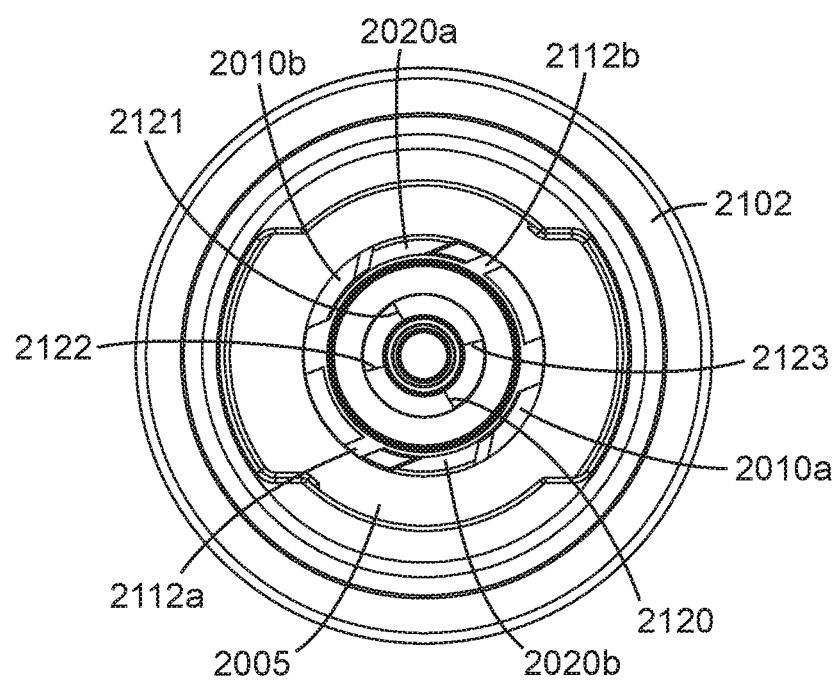
FIG. 55 is the top view according to FIG. 51 after a second stage rotation in the opening direction.

In "Step 3," which is a second stage rotation in the valve opening direction, after a further 90 degree rotation counter-clockwise of the filter cartridge relative to Step 2, the valve body is moved into an open position and water is supplied to the manifold/filter cartridge. The filter is fully installed in Step 3. FIGS. 54 and 55 show the same view and position of the filter cartridge, where FIG. 54 provides the positioning of the valve engagement member relative to the inlet port 2008a of the housing 2002 and the wings 2032a, 2032b of the projection of valve body 2004 and FIG. 55 provides positioning of the retaining members relative 2112a, 2112b relative to the support flange 2005 (valve body is not shown). In Step 3, the first valve driving surfaces (not numbered in FIG. 54 but identified in FIG. 55 as 2120 and 2121) are engaged with the wings 2032a, 2032b, which results in rotating the valve body 2004 to an open position. At this point, water may flow freely into the filter cartridge by way of its inlet opening. The second valve driving surfaces 2122 and 2123 are still not in contact with the wings 2032a, 2032b. Because this is a top view, the support flange 2005 and the cartridge body 2102 are shown. In FIG. 55, cartridge body 2102 is shown. Retaining members 2112a, 2112b have moved past cams 2010a, 2010b and traveled along threads 2226. Generally, it is not expected that the retaining members 2112a, 2112b make contact with any stops during normal use. Stops may be provided to prevent over-rotation of the filter cartridge.

Figure 56:
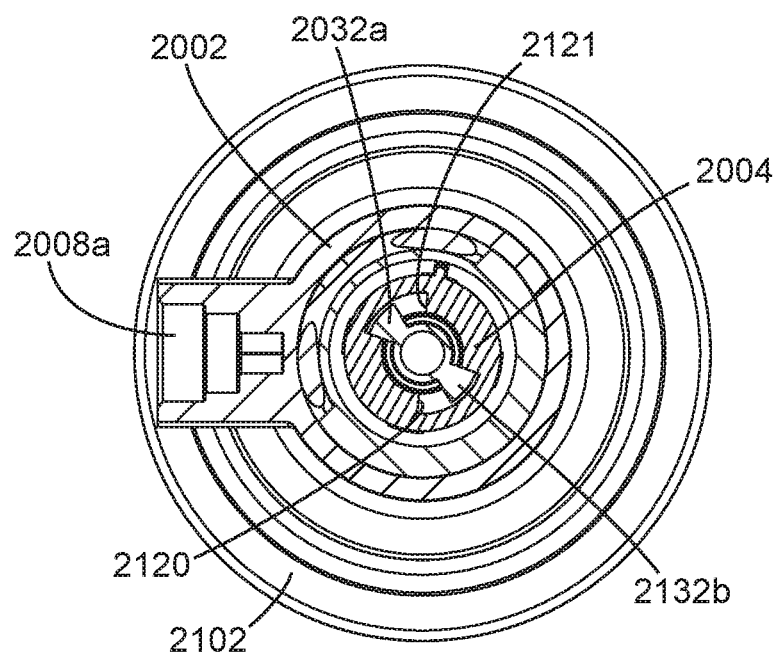
FIG. 56 is the top view according to FIG. 50 after a third stage rotation in a closing direction.
Figure 57:
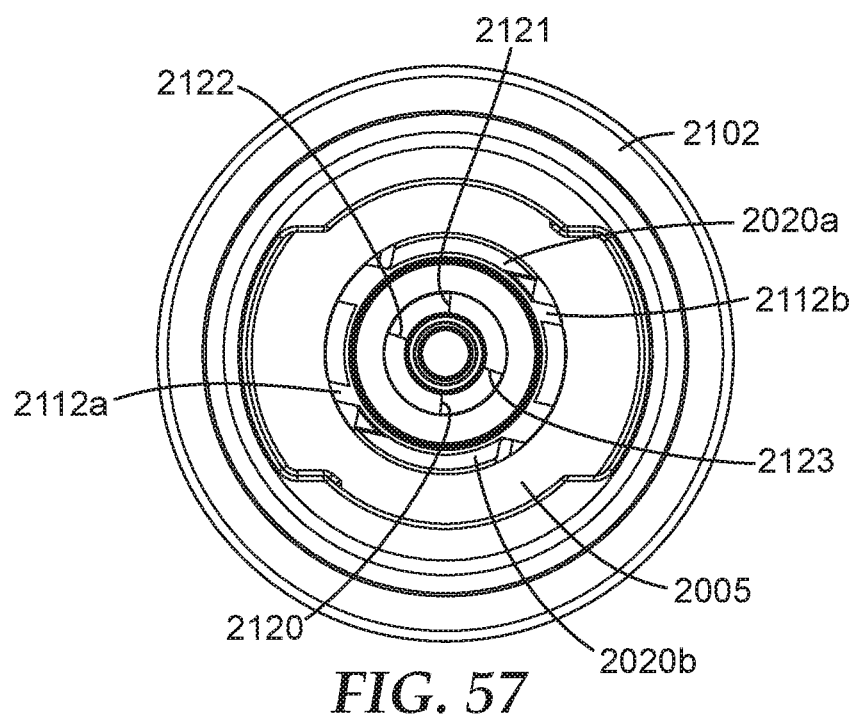
FIG. 57 is the top view according to FIG. 51 after a third stage rotation in a closing direction.

"Step 4" is a third stage rotation in a valve closing direction, which for this example is clockwise. The filter cartridge of FIGS. 56-57 has been rotated 35 degrees clockwise relative to Step 3. FIGS. 56 and 57 show the same view and position of the filter cartridge, where FIG. 56 provides the positioning of the valve engagement member relative to the inlet port 2008a of the housing 2002 and the wings 2032a, 2032b of the projection of valve body 2004 and FIG. 57 provides positioning of the retaining members 2112a, 2112b relative to the support flange 2005 (valve body is not shown). Water is still being supplied to the filter cartridge in this step. In Step 4, the first valve driving surfaces 2120 and 2121 are no longer engaged with the wings 2032a, 2032b. The second valve driving surfaces (not numbered in FIG. 56 but identified in FIG. 57 as 2122 and 2123) come into contact with the wings 2032a, 2032b. Because this is a top view, the support flange 2005 and the cartridge body 2102 are shown. In FIG. 57, cartridge body 2102 is shown. Retaining members 2112a, 2112b are now disposed above the threads and cams (not numbered in FIG. 57 but identified in FIG. 55 as 2226 and 2010a, 2010b, respectively).

Figure 58:
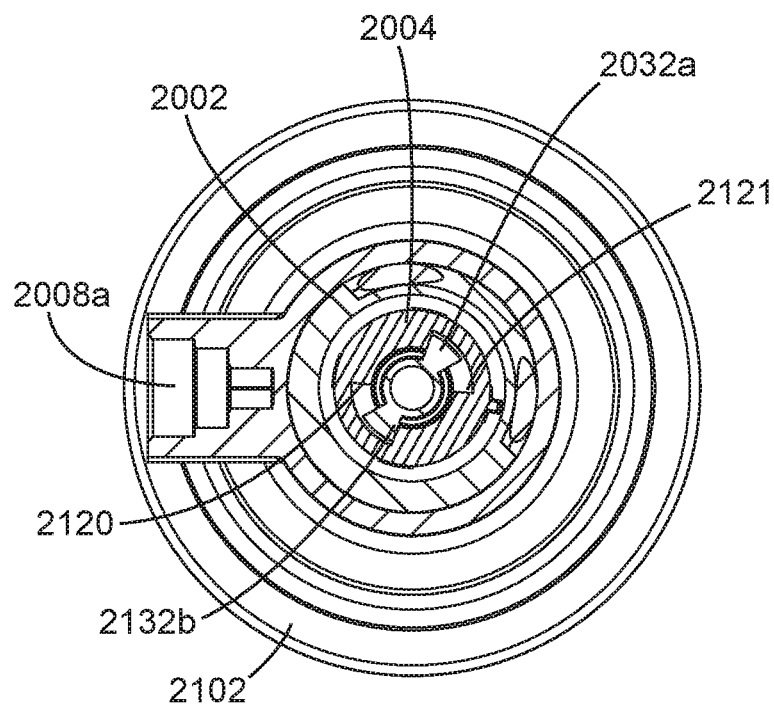
FIG. 58 is the top view according to FIG. 50 after a fourth stage rotation in the closing direction.
Figure 59:
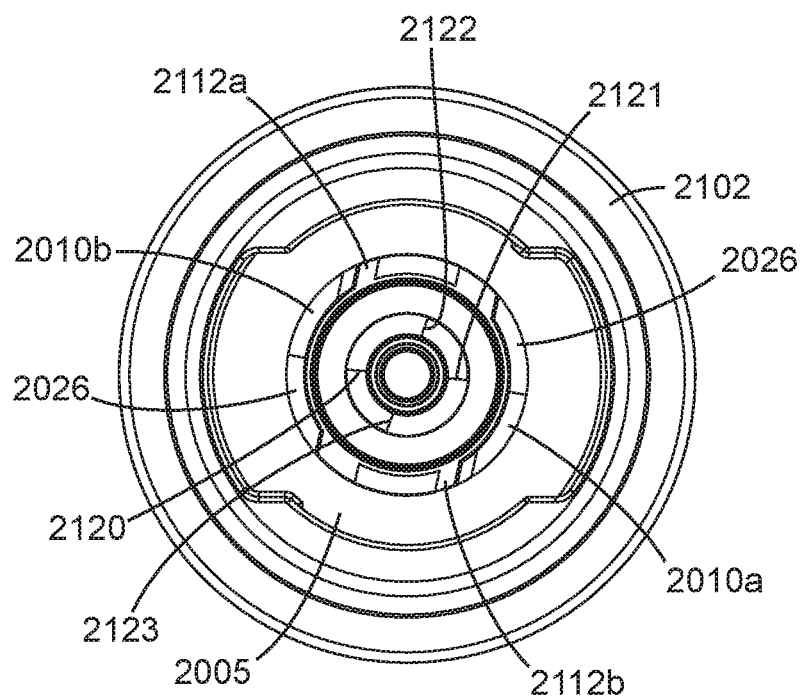
FIG. 59 is the top view according to FIG. 51 after a fourth stage rotation in the closing direction.

In "Step 5," which is a fourth stage rotation in the valve closing direction, after a further 90 degree rotation clockwise of the filter cartridge relative to Step 4, the valve body is moved into a closed position and water is no longer supplied to the manifold/filter cartridge. FIGS. 58 and 59 show the same view and position of the filter cartridge, where FIG. 58 provides the positioning of the valve engagement member 414 relative to the inlet port 2008a of the housing 2002 and the wings 2032a, 2032b of the projection of valve body 2004 and FIG. 59 provides positioning of the retaining members 2112a, 2112b relative to the support flange 2005 (valve body is not shown). In Step 5, the second valve driving surfaces (not numbered in FIG. 58 but identified in FIG. 59 as 2122 and 2123) remain engaged with the wings 2032a, 2032b which results in rotating the valve body 2004 to a closed position. Because this is a top view, the support flange 2005 and the cartridge body 2102 are shown. At this point, water does not flow into the filter cartridge, the retaining members are no longer engaged with the cams, and the filter cartridge can be removed from the manifold. The first valve driving surfaces 2120 and 2121 are still not in contact with the wings 2032a, 2032b. In FIG. 59, retaining members 2112a, 2112b have disengaged from the cams and reside in the insertion gaps. The filter cartridge is removable from the manifold in Step 5 by pulling the filter cartridge in a longitudinal direction to remove the stem from the valve body.

Unless otherwise indicated, all numbers expressing quantities used in the specification and claims are to be understood as being modified in all instances by the term "about." Accordingly, unless indicated to the contrary, the numerical parameters set forth in the following specification and attached claims are approximations that may vary depending upon the desired properties sought to be obtained by the present disclosure. At the very least, and not as an attempt to limit the application of the doctrine of equivalents to the scope of the claims, each numerical parameter should at least be construed in light of the number of reported significant digits and by applying ordinary rounding techniques.

Notwithstanding that the numerical ranges and parameters setting forth the broad scope of the disclosure are approximations, the numerical values set forth in the specific examples are reported as precisely as possible. Any numerical value, however, inherently contain certain errors necessarily resulting from the standard deviation found in their respective testing measurements.

Reference throughout this specification to "one embodiment," "certain embodiments," "one or more embodiments" or "an embodiment" means that a particular feature, structure, material, or characteristic described in connection with the embodiment is included in at least one embodiment of the invention. Thus, the appearances of the phrases such as "in one or more embodiments," "in certain embodiments," "in one embodiment" or "in an embodiment" in various places throughout this specification are not necessarily referring to the same embodiment of the invention. Furthermore, the particular features, structures, materials, or characteristics may be combined in any suitable manner in one or more embodiments.

Although the invention herein has been described with reference to particular embodiments, it is to be understood that these embodiments are merely illustrative of the principles and applications of the present invention. It will be apparent to those skilled in the art that various modifications and variations can be made to the method and apparatus of the present invention without departing from the spirit and scope of the invention. Thus, it is intended that the present invention include modifications and variations that are within the scope of the appended claims and their equivalents.

What is claimed:

1. A fluid filtration system for translational insertion and rotational engagement of a filter cartridge, the system comprising:
   a manifold assembly comprising:
      a cartridge opening;
      an inlet port and an outlet port;
      a valve having a valve body in a housing;
   a filter cartridge comprising:
      a cartridge body and a stem;
      a valve engagement member of the stem that engages with a projection of the valve body and does not impart motion to the valve body during a first stage rotation and that contacts one or more surfaces of a portion of the valve body and imparts rotational movement thereto during a second stage rotation; and
      one or more retaining members;
   wherein the inlet port and outlet port of the manifold assembly are in fluid communication with an inlet opening and an outlet opening, respectively, of the filter cartridge.

2. The system of claim 1, wherein the valve engagement member of the filter cartridge is operatively associated with the valve body during receipt and withdrawal of the filter cartridge from the manifold such that the valve body is moved from a first position to a second position during receipt to put the inlet and outlet ports in fluid communication with the inlet and outlet openings, respectively, and the valve body is moved from the second position to the first position during withdrawal to render no fluid communication between the inlet and outlet ports and the inlet and outlet openings, respectively.

3. The system of claim 1, wherein the housing or a support flange when present comprises one or more manifold cams for engagement with the one or more retaining members of the filter cartridge.

4. The system of claim 1, wherein the valve body comprises a vent.

* * * * *